US008266462B2

(12) United States Patent
Nakaya

(10) Patent No.: US 8,266,462 B2
(45) Date of Patent: Sep. 11, 2012

(54) IMAGE FORMING APPARATUS INCLUDING A BOOSTING-STEP-DOWN TRANSFORMER AND POWER CONTROL METHOD

(75) Inventor: Masahide Nakaya, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/019,071

(22) Filed: Feb. 1, 2011

(65) Prior Publication Data

US 2011/0131434 A1 Jun. 2, 2011

Related U.S. Application Data

(62) Division of application No. 11/545,512, filed on Oct. 11, 2006, now Pat. No. 7,913,098.

(30) Foreign Application Priority Data

Oct. 14, 2005 (JP) ................................ 2005-300328
Nov. 2, 2005 (JP) ................................ 2005-320169
Jul. 26, 2006 (JP) ................................ 2006-203805

(51) Int. Cl.
*G06F 1/26* (2006.01)
*H05B 1/02* (2006.01)

(52) U.S. Cl. .......................... 713/300; 219/216; 399/67

(58) Field of Classification Search .................. 713/300; 219/216; 399/67
See application file for complete search history.

(56) References Cited

U.S. PATENT DOCUMENTS 3,600,551 A 8/1971 Flanegan
4,962,307 A 10/1990 Nakaya
5,132,869 A 7/1992 Nakaya
5,142,329 A 8/1992 Nakaya
5,455,660 A 10/1995 Kunzmann et al.
5,530,878 A 6/1996 Bauer et al.
5,694,030 A 12/1997 Sato et al.
6,246,467 B1 6/2001 Yoshida
6,405,000 B1 6/2002 Nakaya
6,674,980 B2 1/2004 Nakaya
6,931,220 B2 8/2005 Nakaya
7,106,988 B2 9/2006 Nakaya
7,913,098 B2 * 3/2011 Nakaya ........................ 713/300
(Continued)

FOREIGN PATENT DOCUMENTS

EP 1 473 972 A1 11/2004
(Continued)

OTHER PUBLICATIONS

U.S. Appl. No. 07/456,783 filed Dec. 28, 1989.
(Continued)

*Primary Examiner* — Chun Cao
(74) *Attorney, Agent, or Firm* — Oblon, Spivak, McClelland, Maier & Neustadt, L.L.P.

(57) ABSTRACT

A fixing unit fixes a toner image transferred onto a recording medium to the recording medium by heating and pressurizing the toner image. An auxiliary power supply unit includes a charging element that is charged by a power supplied from a main power supply unit. Each of the main power supply unit and the auxiliary power supply unit supplies a power to the fixing unit. A power control unit controls the main power supply unit and the auxiliary power supply unit, so that the power supplied from at least one of the main power supply unit and the auxiliary power supply unit to the fixing unit is kept sufficient.

8 Claims, 35 Drawing Sheets

U.S. PATENT DOCUMENTS

| | | | |
|---|---|---|---|
| 2002/0043523 | A1 | 4/2002 | Fujita et al. |
| 2002/0154919 | A1 * | 10/2002 | Nakaya ........................... 399/69 |
| 2004/0004458 | A1 | 1/2004 | Tanaka et al. |
| 2005/0013626 | A1 * | 1/2005 | Satoh et al. ..................... 399/88 |
| 2005/0139584 | A1 * | 6/2005 | Kishi et al. .................... 219/202 |
| 2005/0139591 | A1 | 6/2005 | Takamatsu et al. |
| 2005/0189923 | A1 | 9/2005 | Ohishi et al. |
| 2005/0220474 | A1 | 10/2005 | Sato et al. |
| 2005/0232651 | A1 | 10/2005 | Sato |
| 2007/0059016 | A1 | 3/2007 | Sato et al. |

FOREIGN PATENT DOCUMENTS

| | | | |
|---|---|---|---|
| JP | 9-218720 | | 8/1997 |
| JP | 10-282821 | * | 10/1998 |
| JP | 11-109786 | | 4/1999 |
| JP | 2000-315567 | | 11/2000 |
| JP | 3359141 | | 10/2002 |
| JP | 2003-140484 | | 5/2003 |
| JP | 2004-234996 | | 8/2004 |
| JP | 3588006 | | 8/2004 |
| JP | 3670977 | | 4/2005 |
| JP | 2005-275129 | | 10/2005 |

OTHER PUBLICATIONS

Office Action issued May 24, 2011 in Japan Application No. 2006-203805.

Japanese Office Action issued Mar. 21, 2012, in Japan Patent Application No. 2011-161987.

* cited by examiner

IMAGE FORMING APPARATUS INCLUDING A BOOSTING-STEP-DOWN TRANSFORMER AND POWER CONTROL METHOD

CROSS-REFERENCE TO RELATED APPLICATIONS

The present application is a divisional application of U.S. Ser. No. 11/545,512, filed Oct. 11, 2006, now U.S. Pat. No. 7,913,098 which claims priority to Japanese application numbers 2005-300328, filed Oct. 14, 2005, 2005-320169, filed Nov. 2, 2005, and 2006-203805, filed Jul. 26, 2006, the entirety of all of which are incorporated herein by reference.

BACKGROUND OF THE INVENTION

1. Field of the Invention

The present invention relates to an image forming apparatus including a fixing device that employs a heating member such as a fixing heater that is heated by a charged power of a charging element.

2. Description of the Related Art

A technique for improving a power-saving effect is disclosed in, for example, Japanese Patent Application Laid-Open No. 2000-315567, Japanese Patent Application Laid-Open No. 2002-174988, and Japanese Patent Application Laid-Open No. 2003-140484, in which a sudden transient build-up current can be carried to a heating member (a fixing heater) of a fixing device employed in an electrophotographic image-forming apparatus using not only power supplied from a commercial power supply but also that supplied from a chargeable auxiliary power-supply using an electric double-layer capacitor or the like.

According to the above technique, if a mass-storage capacitor is used as the auxiliary power supply, a high current can be instantly supplied to the fixing device even if the supply of the power from the commercial power supply to the fixing device runs short. It is, therefore, possible to prevent degradation of fixability of the fixing device due to the power shortage.

Meanwhile, if an alternating current (AC) is mainly used as the power supplied from the commercial power supply to the fixing heater, an inrush current is often generated when the fixing device is subjected to temperature control. As a result, reliability of the fixing device is deteriorated. Furthermore, to suppress the inrush current, there is known soft-starting of application of a current to an AC control element such as a triac synchronously with a phase angle of the commercial power supply. The soft-starting has, however, a disadvantage of generating a conducted interference with the commercial power supply.

To cope with the disadvantage, a technique is disclosed in, for example, Japanese Patent Application Laid-Open No. H9-218720, Japanese Patent Application Laid-Open No. H11-109786, and Japanese Patent No. 3359141 (Japanese Patent Application Laid-Open No. H7-219655), in which the AC from the commercial power supply is rectified into a pulsating current, and the pulsating current is applied to the fixing heater while power-controlling the pulsating current at a frequency higher than a frequency of the AC of the commercial power supply.

With this mechanism, a load current is carried over entire cycles of the AC and a power factor of the commercial power supply is improved. In addition, by changing an amplitude of a voltage output to the fixing heater, a peak of the load current can be made proportional to load power. It is, therefore, possible to employ a switching element having an optimum current capacity to correspond to the load power.

However, the technique disclosed in Japanese Patent Application Laid-Open No. H9-218720, Patent Application Laid-Open No. H11-109786, and Japanese Patent No. 3359141 (Japanese Patent Application Laid-Open No. H7-219655) is unable to overcome the power shortage solved by the Japanese Patent Application Laid-Open No. 2000-315567, Patent Application Laid-Open No. 2002-174988, and Patent Application Laid-Open No. 2003-140484, and as a result, the power shortage may cause a degradation in the fixability of the fixing device.

Moreover, according to the conventional techniques, the power of the commercial power supply and that of the auxiliary power supply constituted by the battery element should be supplied to different fixing heaters. As a result, the image forming apparatus is disadvantageously complicated and expensive.

Furthermore, even if the power of the commercial power supply and that of the auxiliary power supply are supplied to one fixing heater, the power is supplied only from the power supply having a high supply voltage. As a result, to quickly activate the fixing heater, a commercial power supply having a high power capacity or an auxiliary power supply is necessary.

SUMMARY OF THE INVENTION

It is an object of the present invention to at least partially solve the problems in the conventional technology.

An image forming apparatus according to one aspect of the present invention includes a fixing unit that fixes a toner image transferred onto a recording medium to the recording medium by heating and pressurizing the toner image; an auxiliary power supply unit including a charging element that is charged by a power supplied from a main power supply unit, each of the main power supply unit and the auxiliary power supply unit supplying a power to the fixing unit; and a power control unit that controls the main power supply unit and the auxiliary power supply unit, so that the power supplied from at least one of the main power supply unit and the auxiliary power supply unit to the fixing unit is kept sufficient.

A method according to another aspect of the present invention is for controlling a power in an image forming apparatus the includes a fixing unit that fixes a toner image transferred onto a recording medium to the recording medium by heating and pressurizing the toner image and an auxiliary power supply unit including a charging element that is charged by a power supplied from a main power supply unit. Each of the main power supply unit and the auxiliary power supply unit supplies a power to the fixing unit. The method includes controlling the main power supply unit and the auxiliary power supply unit, so that the power supplied from at least one of the main power supply unit and the auxiliary power supply unit to the fixing unit is kept sufficient.

An image forming apparatus according to still another aspect of the present invention includes a fixing means for fixing a toner image transferred onto a recording medium to the recording medium by heating and pressurizing the toner image; an auxiliary power supply means including a charging element that is charged by a power supplied from a main power supply means, each of the main power supply means and the auxiliary power supply means supplying a power to the fixing means; and a power control means for controlling the main power supply means and the auxiliary power supply means, so that the power supplied from at least one of the main power supply means and the auxiliary power supply means to the fixing means is kept sufficient.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained hereinafter with reference to the accompanying drawings.

Figure 1A:
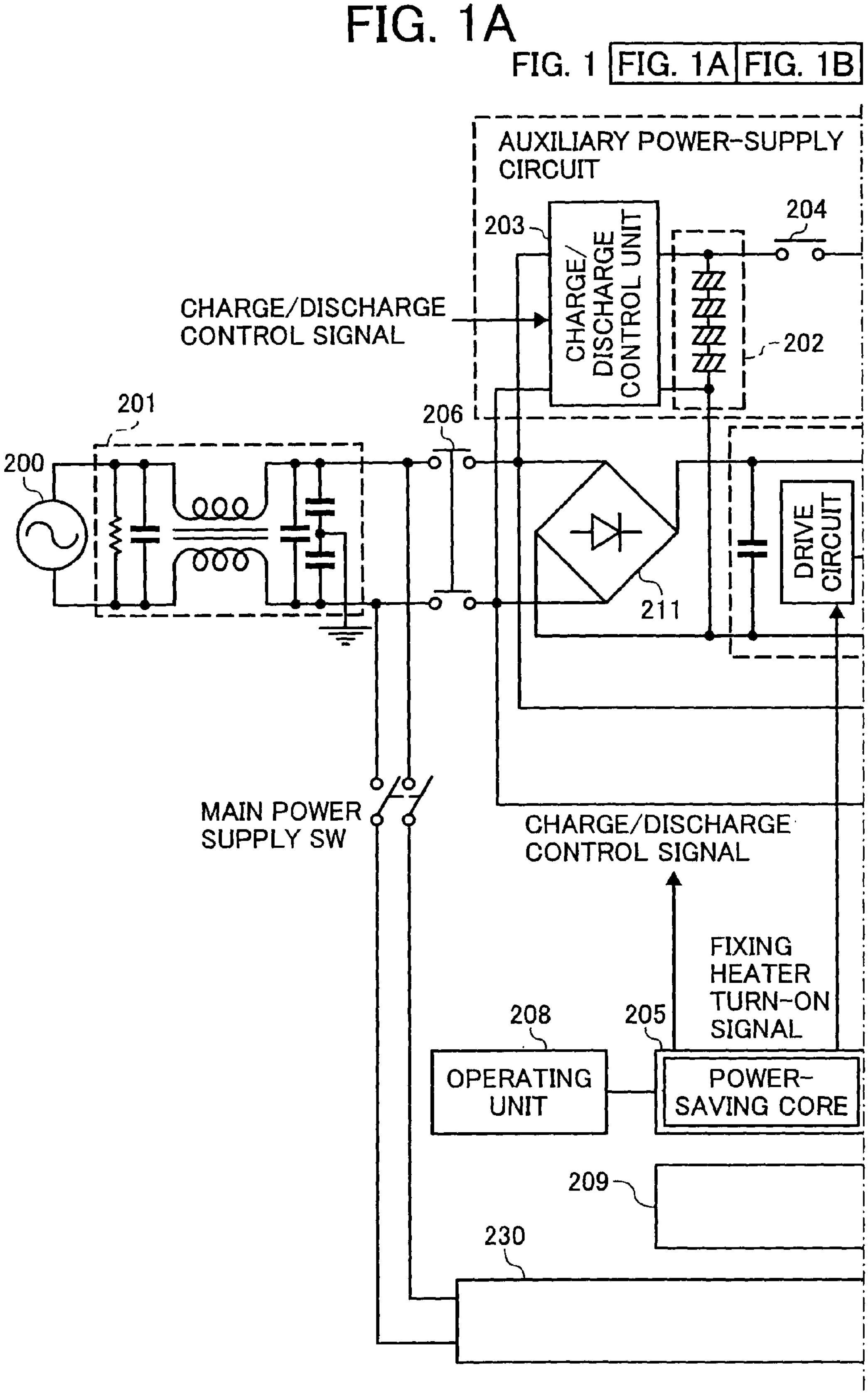
FIG. 1 is a schematic diagram of a control system centering around a fixing device in a digital copier according to a first embodiment of the present invention.
Figure 1B:
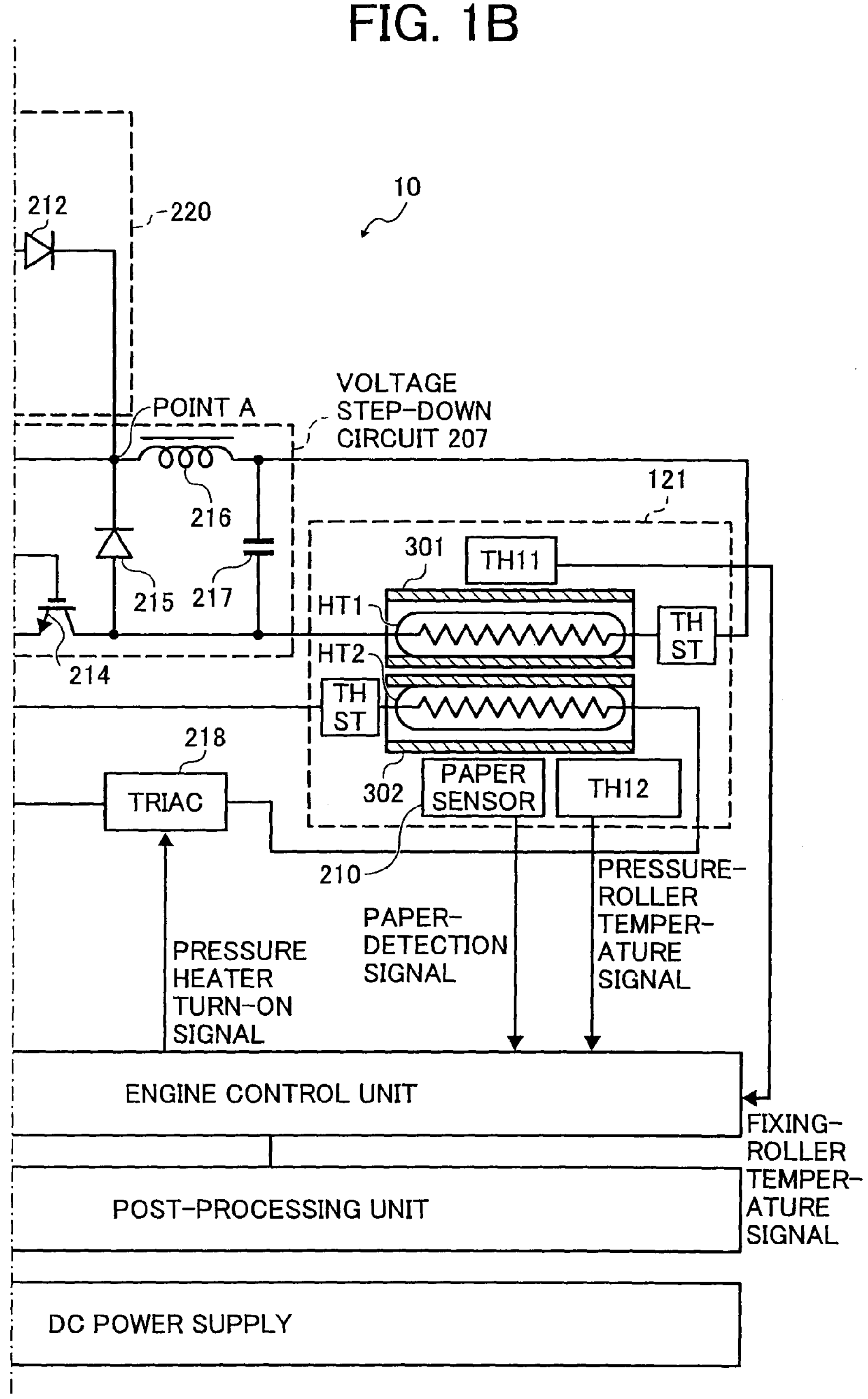

FIG. 1 is a block diagram of a control system 10 in a digital copier 1 that is an image forming apparatus according to a first embodiment of the present invention. The control system 10 includes a fixing device 121 that includes a fixing heater HT1 and a pressure heater HT2. The fixing heater HT1 receives a power from a commercial power supply (an AC power supply) 200 through a transformer 201 and a power from a battery element 202 included in an auxiliary power-supply circuit 220. The fixing heater HT1 thereby generates heat. The pressure heater HT2 receives a power from the commercial power supply 200 and thereby generates heat.

Specifically, the AC power supplied from the commercial power supply 200 is transformed into a direct-current (DC) power. The DC power is supplied to the fixing heater HT1 through a relay 206 serving as a switching element, a rectifier 211, and a voltage step-down circuit 207. The fixing heater HT1, which receives the DC power, generates heat. The battery element 202 of the auxiliary power-supply circuit 220 is charged with power from the commercial power supply 200, and supplies the DC power to the fixing heater HT1 through the voltage step-down circuit 207. The fixing heater HT1, which receives the DC power, generates heat.

The auxiliary power-supply circuit 220 also includes a charge-discharge control unit 203 that controls charge and discharge. As the battery element 202, an electric double-layer capacitor, an ordinary capacitor, a primary battery or the like is used. The charge-discharge control unit 203 includes a charger that receives the power from the commercial power supply and that charges the battery element 202 with the power. The charge-discharge control unit 203 controls the discharge of power to the voltage step-down circuit 207 through a switching element such as a relay 204.

The control system 10 also includes an engine control unit 205 that operates at the power supplied from a DC power supply 230 and that controls the entire digital copier 1 or particularly a printer engine (not shown). The engine control unit 205 is constituted by a microcomputer including such constituent elements (not shown) as a central processing unit (CPU), a read-only memory (ROM), and a random-access memory (RAM). The CPU is connected to the ROM that stores therein a program and data for controlling the digital copier 1.

The engine control unit 205 includes an power-saving core that controls power consumption of the entire digital copier 1. The engine control unit 205 switches over the power between a power consumed by the respective constituent elements of the digital copier 1 and a power consumed by the engine control unit 205 according to a plurality of power-saving levels.

The engine control unit 205 controls the voltage step-down circuit 207 that connects the fixing heater HT1 to the commercial power supply 200 to be turned on or off. The engine control unit 205 thereby controls a current-carrying operation for carrying a current to the fixing heater HT1 (to turn on or off the fixing heater HT1). Furthermore, the engine control unit 205 controls a triac 218 to be turned on or off, thereby controlling a current-carrying operation for carrying a current to the pressure heater HT2. The fixing device 121 includes safety thermostats THST.

An operating unit 208 and a post-processing unit 209 are connected to the engine control unit 205. The control system 10 includes the DC power supply 230 that generates a DC voltage (e.g., five volts or 24 volts) for control and driving used in each load of the digital copier 1. The DC power supply 230 receives the power from the commercial power supply 200 and generates the DC voltage.

The fixing device 121 further includes a paper sensor 210 that detects passing of a sheet passing through between a fixing roller 301 and a pressure roller 302 of the fixing device 121.

The engine control unit 205 includes a power-supply selecting unit (not shown). The power-supply selecting unit selects one of the commercial power supply 200, the auxiliary power-supply circuit 220 including the battery element 202, and both the commercial power supply 200 and the auxiliary power-supply circuit 220 as the power supply for the voltage step-down circuit 207 for carrying the current to one heater (fixing heater HT1). The engine control unit 205 also includes a function of a power control unit (not shown) that controls the power-supply selecting unit to make selection of the power.

In the engine control unit 205, the power control unit is executed mainly by software. The power control unit controls the power-supply selecting unit to select the power to be supplied to the fixing heater HT1 using the relays 206 and 204.

An instance in which the power is supplied to the fixing heater HT1 from the commercial power supply 200 will first be explained. To supply the power to the fixing heater HT1 only from the commercial power supply 200, the relay 204 is turned off and the relay 206 is turned on. By so setting, the power is supplied only from the commercial power supply 200 to the voltage step-down circuit 207. The power supplied from the commercial power supply 200 is selected mainly when the digital copier 1 is active (performs a print operation). The AC voltage from the commercial power supply 200 is subjected to full-wave rectification by the rectifier 211 and input to the voltage step-down circuit 207.

The voltage step-down circuit 207 is a well-known chopper DC/DC converter and driven by a main switching element 214 arranged on a low side of the voltage step-down circuit 207. The voltage step-down circuit 207 includes the main switching element 214, a drive circuit, a choke coil 216, a rectifier 215 for flywheel, and a smoothing capacitor 217.

The engine control unit 205 supplies a drive signal to the voltage step-down circuit 207 through the drive circuit. Namely, the drive signal is a pulse-width modulation (PWM) signal a frequency of which is set to about 20 kilohertz far higher than a frequency of the commercial power supply 200.

The PWM signal makes a pulse width of an active-level pulse variable with a cycle of the pulse fixed. An amplitude of the voltage applied to the fixing heater HT1 can be changed to a desired amplitude in response to the PMW signal. In addition, an amount of heat generated in the fixing roller 301 is finally controlled in response to the PMW signal. In the voltage step-down circuit 207, an electrostatic capacity of the smoothing capacitor 217 arranged on an output side of the voltage step-down circuit 207 is set to a relatively low capacity. By so setting, the voltage step-down circuit 207 can output a voltage (fixing-heater current) having a waveform similar to a voltage input to the voltage step-down circuit 207.

Figure 2A:
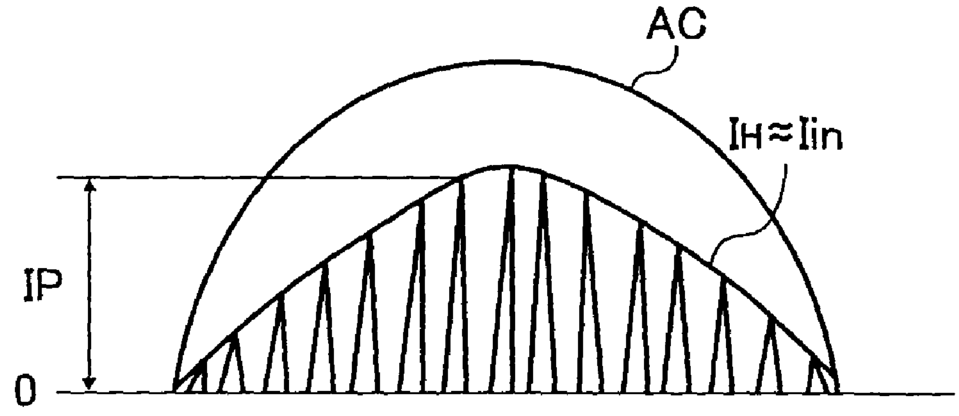
FIG. 2A is a schematic diagram of a current waveform carried from a commercial power supply to a fixing heater.
Figure 2B:
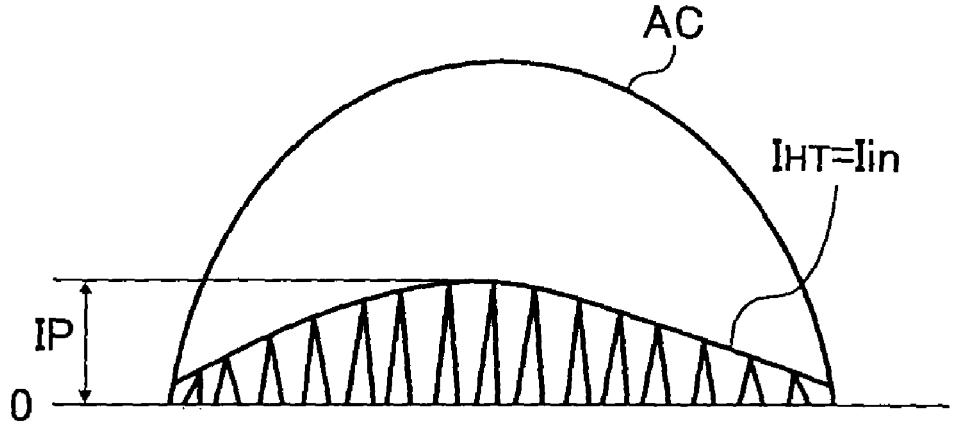
FIG. 2B is a schematic diagram of a current waveform carried from the commercial power supply to the fixing heater.

FIGS. 2A and 2B are waveform views of a current IP carried to the choke coil 216 in response to the PWM signal. The current I is applied from the commercial power supply 200. An envelope of the current I is of a sinusoidal wave shape. By changing a level of the PWM signal according to an ON-OFF ratio of the main switching element 214, the amplitude of the sinusoidal wave can be changed.

Figure 3:
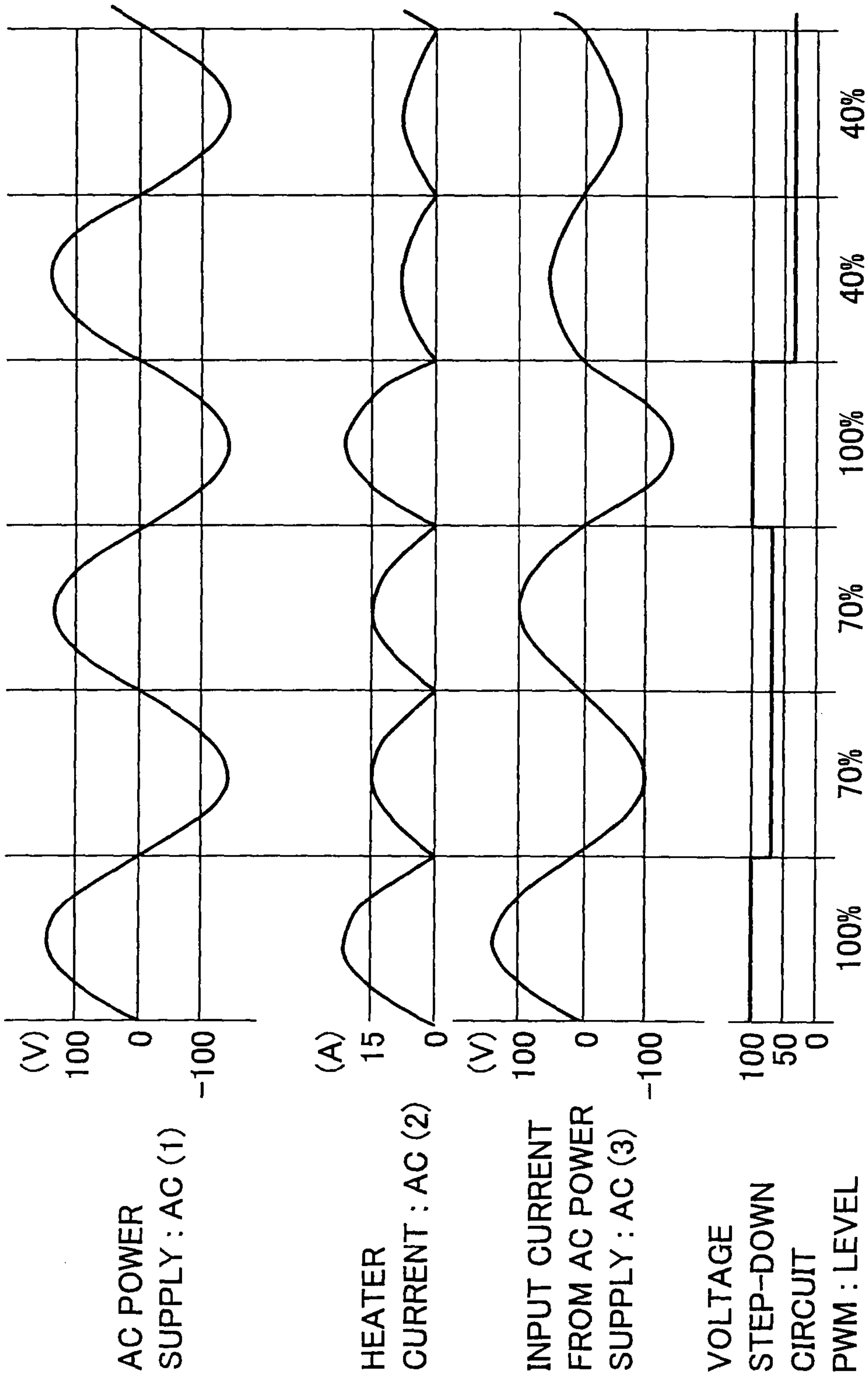
FIG. 3 is a schematic diagram of a current waveform carried to the fixing heater when an output of a voltage step-down circuit is variable.

FIG. 3 is a schematic diagram of input currents to the fixing heater HT1 and the digital copier 1 if the level of the PWM signal is changed to 100%, 70%, and 40%, respectively. It is to be noted that the current carried to the fixing heater HT1 similarly is controlled in response to the PWM signal if the power is supplied to the voltage step-down circuit 207 from the battery element 202 of the auxiliary power-supply circuit 220.

An instance in which the power is supplied to the fixing heater HT1 from the battery element 202 of the auxiliary power-supply circuit 220 will be explained. In this instance, the relay 204 is turned on and the relay 206 is turned off. By doing so, the power from the commercial power supply 200 to the voltage step-down circuit 207 is cut off, and the power is supplied to the fixing heater HT1 only from the battery element 202 of the auxiliary power-supply circuit 220.

The auxiliary power-supply circuit 220 is selected mainly for time since the digital copier 1 is started (warm-up time, print-start time, or time of return from an power-saving mode) until an inrush current applied to the fixing heater HT1 converges into a predetermined value so as to level the input current and to reduce a temperature ripple of the fixing roller 301.

The voltage step-down circuit 207 operates similarly to the instance in which the power is supplied to the voltage step-down circuit 207 only from the commercial power supply 200. The voltage input to the voltage step-down circuit 207 is a DC voltage from the auxiliary power-supply circuit 220 connected to a point A. The DC voltage is supplied to the fixing heater HT1. Similarly to the instance in which the power is supplied only from the commercial power supply 200, the temperature of the fixing roller 301 is controlled in response to the PWM signal applied to the voltage step-down circuit 207.

If the power is supplied from the commercial power supply 200, the temperature ripple occurs to the fixing roller 301 due to a voltage change in a cycle of the commercial power supply 200. If the power is supplied from the battery element 202 of the auxiliary power-supply circuit 220, the DC voltage is output from the voltage step-down circuit 207. Therefore, no temperature ripple occurs to the fixing roller 301.

An instance in which the power is supplied to the fixing heater HT1 from both the commercial power supply 200 and the auxiliary power-supply circuit 220 will be explained. The engine control unit 205 controls both the relays 204 and 206 to be turned on. If so, both the commercial power supply 200 and the battery element 202 of the auxiliary power-supply circuit 220 are connected to the voltage step-down circuit 207. Higher one of the power supplied from the commercial power supply 200 and that supplied from the battery element 202 of the auxiliary power-supply circuit 220 is supplied to the voltage step-down circuit 207.

Both the power from the commercial power supply 200 and that from the battery element 202 of the auxiliary power-supply circuit 220 are selected mainly when the digital copier 1 is started (during warm-up time, print-start time, or at time of return from an power-saving mode), or particularly when the temperature of the fixing heater HT1 is higher than a predetermined temperature.

The voltage step-down circuit 207 operates similarly to the instance in which the power is supplied to the voltage step-down circuit 207 only from the commercial power supply 200. Similarly to the instance in which the power is supplied to the voltage step-down circuit 207 only from the commercial power supply 200, the temperature of the fixing roller 301 is controlled in response to the PWM signal applied to the voltage step-down circuit 207.

The power is input to the voltage step-down circuit 207 by a diode-OR circuit constituted by the commercial power supply 200 through the rectifier 211 and the auxiliary power-supply circuit 220 through a rectifier 212. Due to this, the power at the higher voltage is supplied to the voltage step-down circuit 207. Therefore, before and after a zero-crossing point during which the voltage of the commercial power supply 200 is lower than that of the auxiliary power-supply circuit 220, the power is supplied not from the commercial power supply 200 but only from the auxiliary power-supply circuit 220.

Therefore, the current input from the commercial power supply 200 to the digital copier 1 is lower than that when the commercial power supply 200 is only the power supply of the digital copier 1 because the auxiliary power-supply circuit 220 can be also employed as the power supply. On the other hand, the power that can be supplied to the fixing heater HT1 is higher than that when the commercial power supply 200 is only the power supply of the digital copier 1 because the auxiliary power-supply circuit 220 can be also employed as the power supply. Thanks to these, it is advantageously possible to reduce time for raising the temperature of the fixing roller 301 and to realize current-leveling (first current-leveling) of the commercial power supply 200 due to the reduction of the current input to the digital copier 1.

The current-leveling of the commercial power supply 200 will be explained. If the power is supplied from both the commercial power supply 200 and the battery element 202 of the auxiliary power-supply circuit 220, one power cycle of the commercial power supply 200 is divided into two cycles for the commercial power supply 200 and the battery element 202, respectively. Moreover, to level the current of the commercial power supply 200 more actively, the engine control unit 205 selects the power supplied from the battery element 202 when the fixing heater HT1 is started in a cold environment.

As well known, when a halogen heater is started in the cold environment, an inrush current is applied to the halogen heater and high power is consumed. However, the high power can instantly heat a filament that is a heating member provided in the halogen heater, and the temperature of the fixing roller 301 can be promptly raised.

Furthermore, when the fixing heater HT1 is started, the digital copier 1 is normally started. Therefore, the current applied to the entire digital copier 1 is high. For this reason, it often disadvantageously takes long startup time although startup timings of the respective constituent elements of the digital copier 1 are shifted.

The time when the inrush current is applied to the applied to the fixing heater HT1 is about 200 milliseconds to about 500 milliseconds after the supply of the power to the fixing heater HT1 is started. During this period, the power is supplied to the fixing heater HT1 from the battery element 202. By doing so, the influence of the inrush current on the current input to the digital copier 1 can be lessened, and the current-leveling (second leveling) of the commercial power supply 200 can be thereby realized.

Figure 4A:
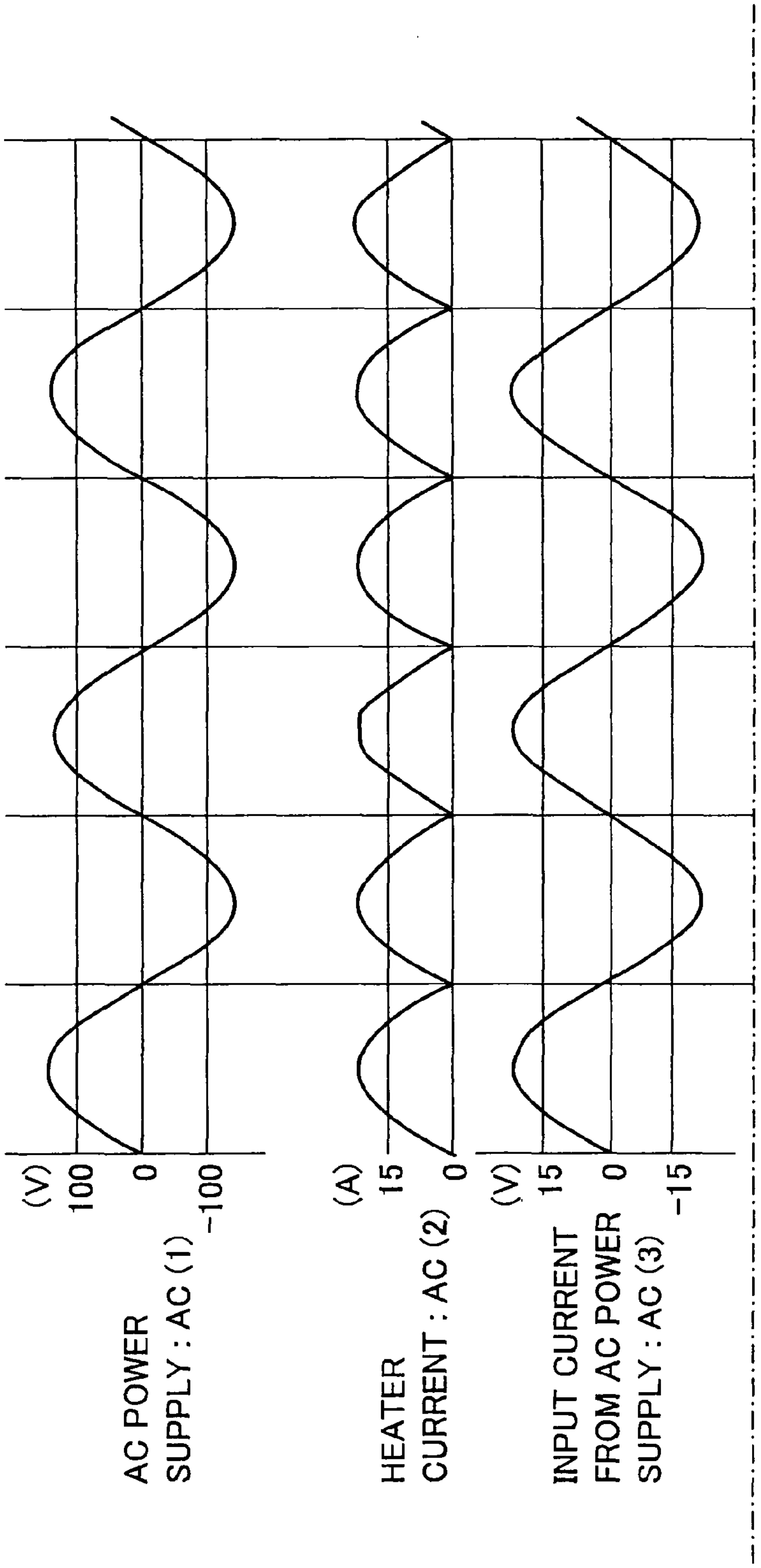
FIG. 4 is a schematic diagram of waveforms carried to a chopper voltage step-down circuit.
Figure 4B:
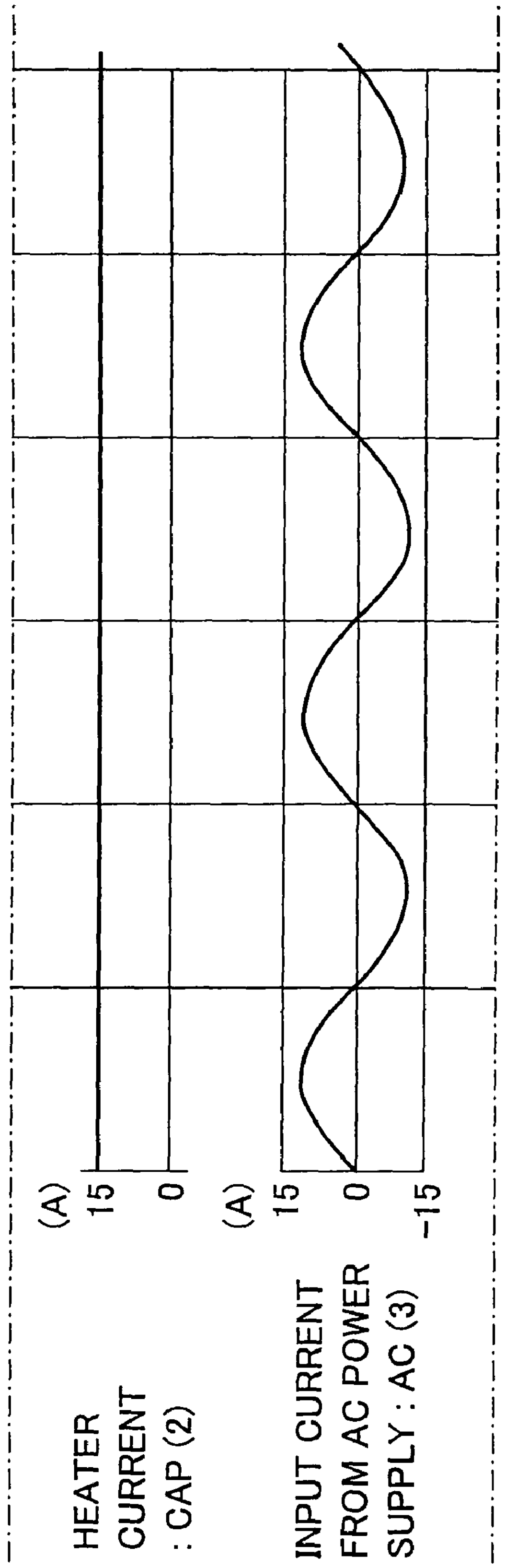
Figure 4C:
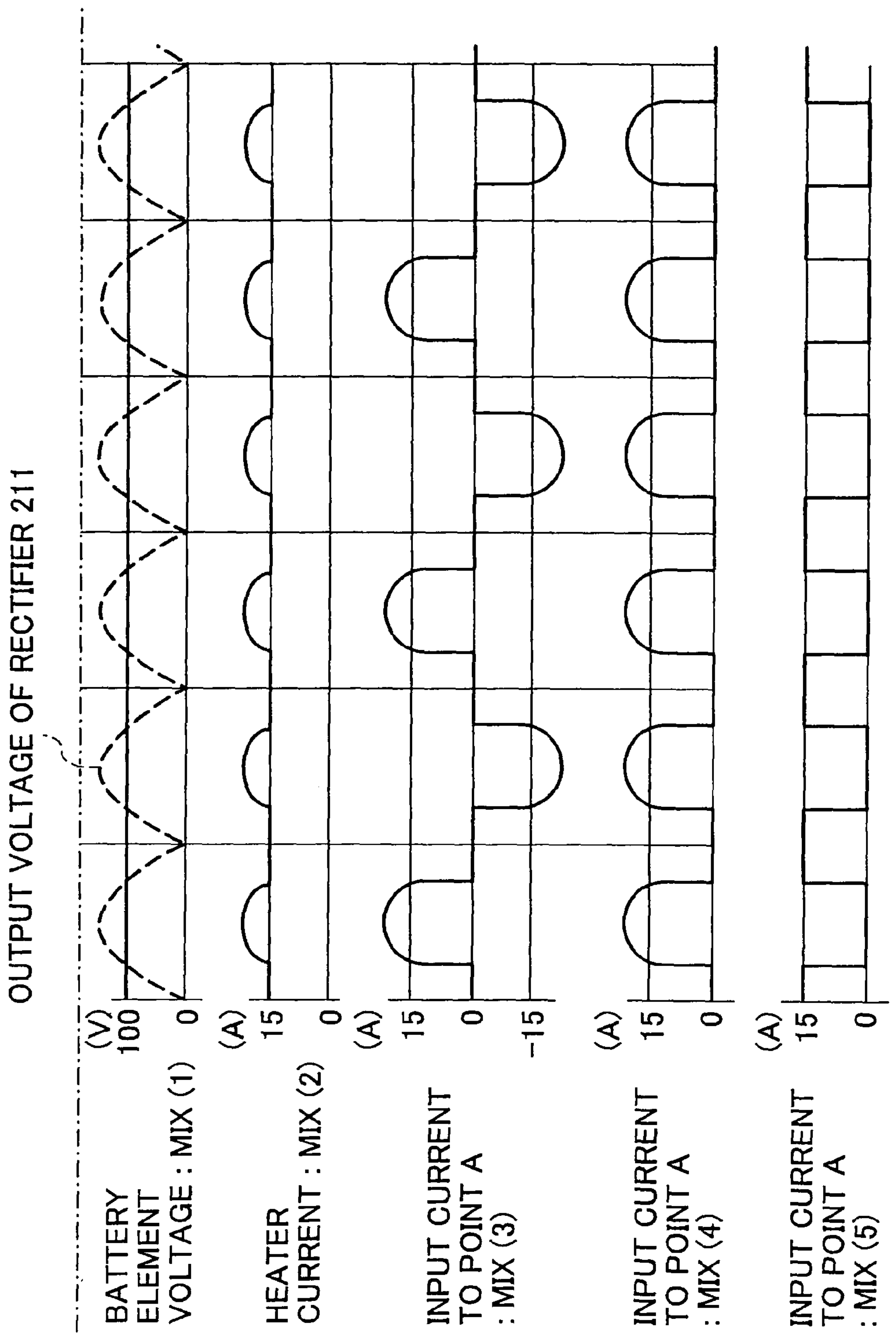

Waveforms of the power supplied from the commercial power supply 200 and the auxiliary power-supply circuit 220 to the fixing heater HT1 will be explained with reference to FIG. 4. In FIG. 4, AC(1) denotes the voltage input to the digital copier 1. If only the commercial power supply 200 is connected to the voltage step-down circuit 207, then the current applied to the fixing heater HT1 has a full-wave rectified waveform as indicated by AC(2) in FIG. 4. The current input to the digital copier 1 corresponds to the current having a waveform AC(3), and most of the current is applied to the fixing heater HT1.

If only the battery element 202 of the auxiliary power-supply circuit 220 is connected to the voltage step-down circuit 207, the current applied to the fixing heater HT1 has a DC waveform CAP(2). In addition, the current input to the digital copier 1 has a waveform CAP(3). Because no current is supplied to the fixing heater HT1, the current having the waveform CAP(3) is far lower that those in the other states.

If both the commercial power supply 200 and the battery element 202 of the auxiliary power-supply circuit 220 are connected to the voltage step-down circuit 207, the current applied to the fixing heater HT1 has a waveform MIX(2), which is a combination of the waveform AC(2) and the waveform CAP(2). Furthermore, the current input to the digital copier 1 has a waveform MIX(3), which has an intermediate magnitude between the waveform AC(3) and the waveform CAP(3).

At the point A at which the auxiliary power-supply circuit 220 is connected to the voltage step-down circuit 207, the current is supplied to the voltage step-down circuit 207 from one of the commercial power supply 200 and the auxiliary power-supply circuit 220. Therefore, the input current having a waveform MIX(4) obtained by full-wave rectifying the waveform MIX(3) is supplied from the commercial power supply 200 whereas a current having a waveform MIX(5) is supplied from the battery element 202. Namely, before and after the period corresponding to the zero-crossing point during which the voltage of the commercial power supply 200 is low, the current is supplied from the battery element 202 of the auxiliary power-supply circuit 220. By doing so, as compared with the instance in which the commercial power supply 200 is only one power supply of the digital copier 1, it is possible to supply higher current to the fixing heater HT1.

On the other hand, the pressure heater HT2 serving as a second heating member receives the power from the commercial power supply 200 by causing the engine control unit 205 to turn on the relay 206 and the triac 218.

In this manner, the engine control unit 205 controls the supply of the power to the fixing heater HT1 and the pressure heater HT2 serving as the first heating member and the second heating member in the fixing device 121 so that temperatures of the fixing roller 301 and the pressure roller 302 detected by thermistors TH11 and TH12, respectively, become equal to predetermined values.

Figure 5A:
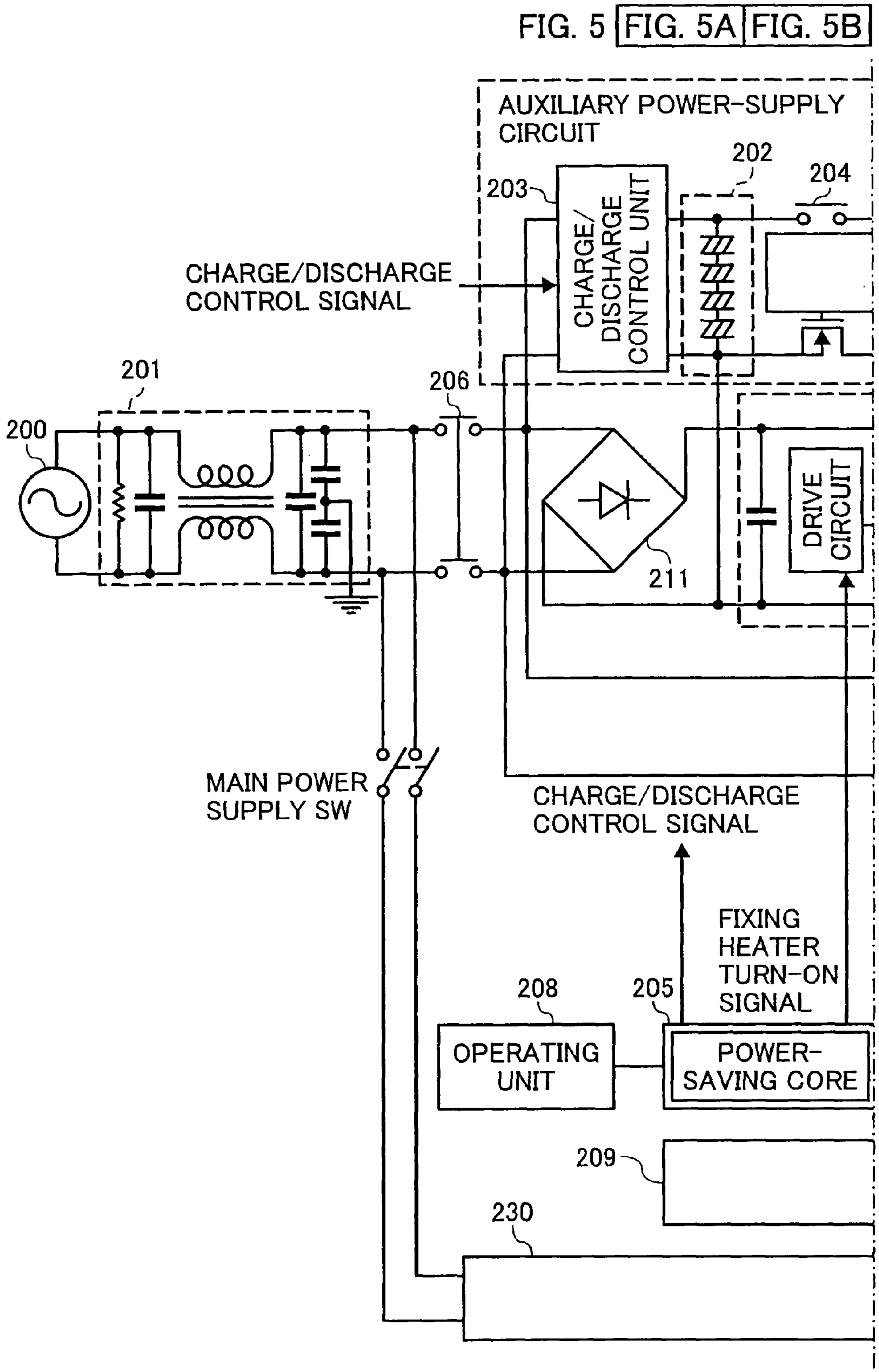
FIG. 5 is a schematic diagram of a control system centering around a fixing device in a digital copier according to a second embodiment of the present invention.
Figure 5B:
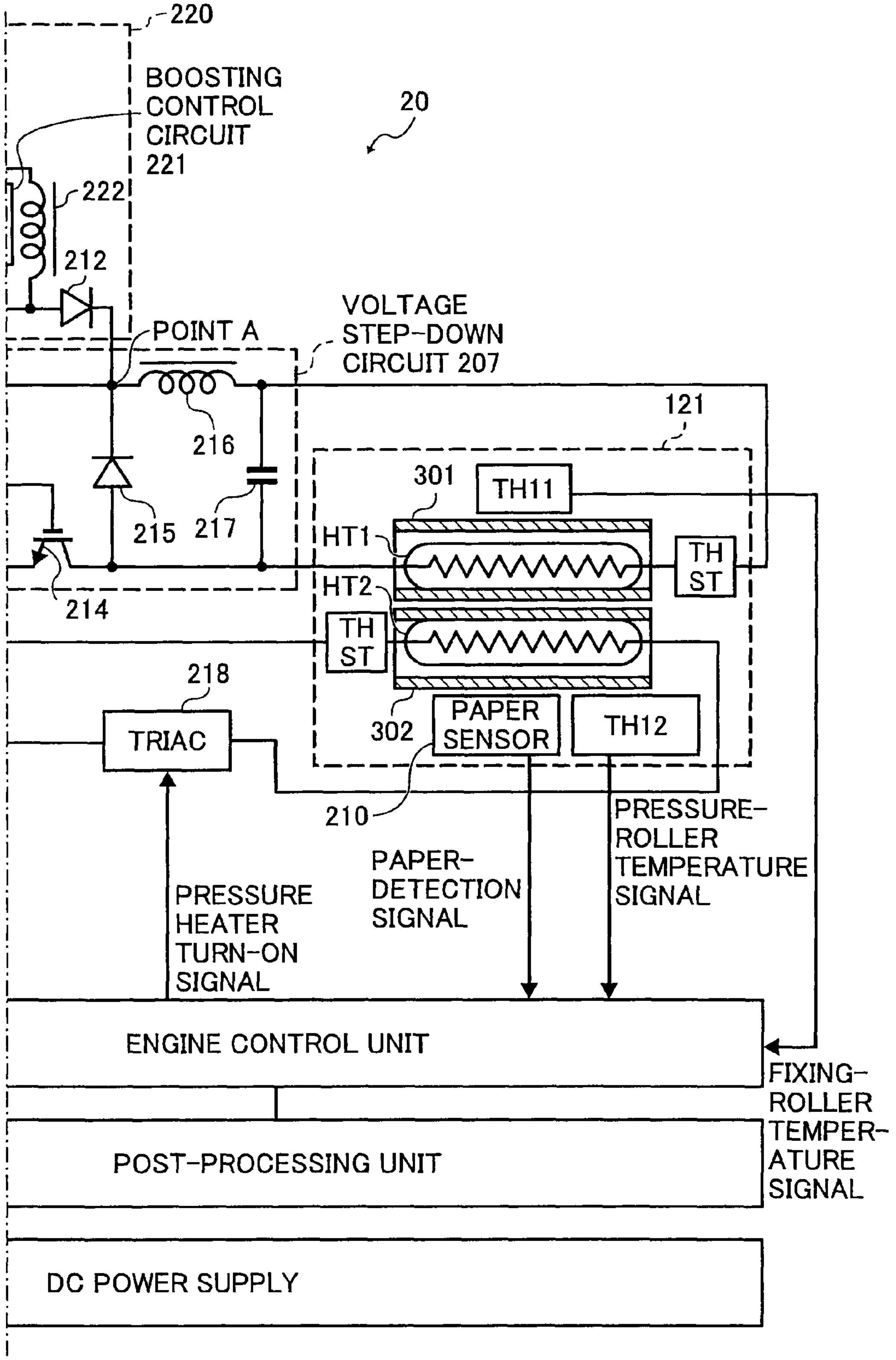

An image forming apparatus according to a second embodiment of the present invention will be explained with reference to FIG. 5. FIG. 5 is a block diagram of a control system 20 in the digital copier 1 that is the image forming apparatus according to the second embodiment. The same constituent elements of the control system 20 as those explained in the first embodiment are denoted by the same reference symbols, respectively, and will not be repeatedly explained herein.

The control system 20 mainly including the fixing device 121 according to the second embodiment is characterized as follows. The auxiliary power-supply circuit 220 includes a boosting circuit that boosts up the voltage of the battery element 202. An output of the boosting circuit is supplied to the voltage step-down circuit 207 that supplies the power to the fixing device 121. The power is supplied from the voltage step-down circuit 207 to the fixing roller 301, thereby stabilizing the supplied voltage, reducing a fluctuation in power consumption of the digital copier 1, reducing the number of battery elements 202, and doing other things.

The boosting circuit is a well-known chopper DC/DC converter (boosting converter). The boosting circuit includes a boosting control circuit 221, a choke coil 222, a main switching element 223 for driving, the rectifier 212 for boosting, and the like.

The boosting control circuit 221 generates a drive signal, and outputs the PWM signal the frequency of which is set far higher to about 20 kilohertz than that of the commercial power supply 200. The engine control unit 205 indicates a level of a boosted output (an output voltage) through the charge-discharge control unit 203.

The boosting circuit of the auxiliary power-supply circuit 220 controls the voltage of the battery element 202 to a predetermined value (e.g., 90 volts). It is thereby possible to always output a constant voltage even if the charged voltage of the battery element 202 is changed. Furthermore, because the boosting circuit can boost up input voltage about twofold, the number of battery elements 202 can be advantageously reduced.

It is necessary to set a voltage necessary to turn on the fixing heater HT1 serving as a load to be equal to or higher than “lowest voltage necessary to maintain a halogen cycle in the halogen heater”. In addition, an upper limit of the large-capacity battery element such as the electric double-layer capacitor that constitutes the battery element 202 is 2.5 volts. The large-capacity battery element is lower than an ordinary capacitor (battery element) in upper limit of charged voltage. Due to this, according to the conventional technique, a plurality of battery elements are connected in series to produce a desired voltage.

In the second embodiment, even if the charged voltage of the battery element 202 is lowered by discharge, the voltage supplied to the fixing heater HT1 can be set constant by providing the boosting circuit. Therefore, an amount of heat emitted from the fixing device 121 can be set constant.

Figure 6:
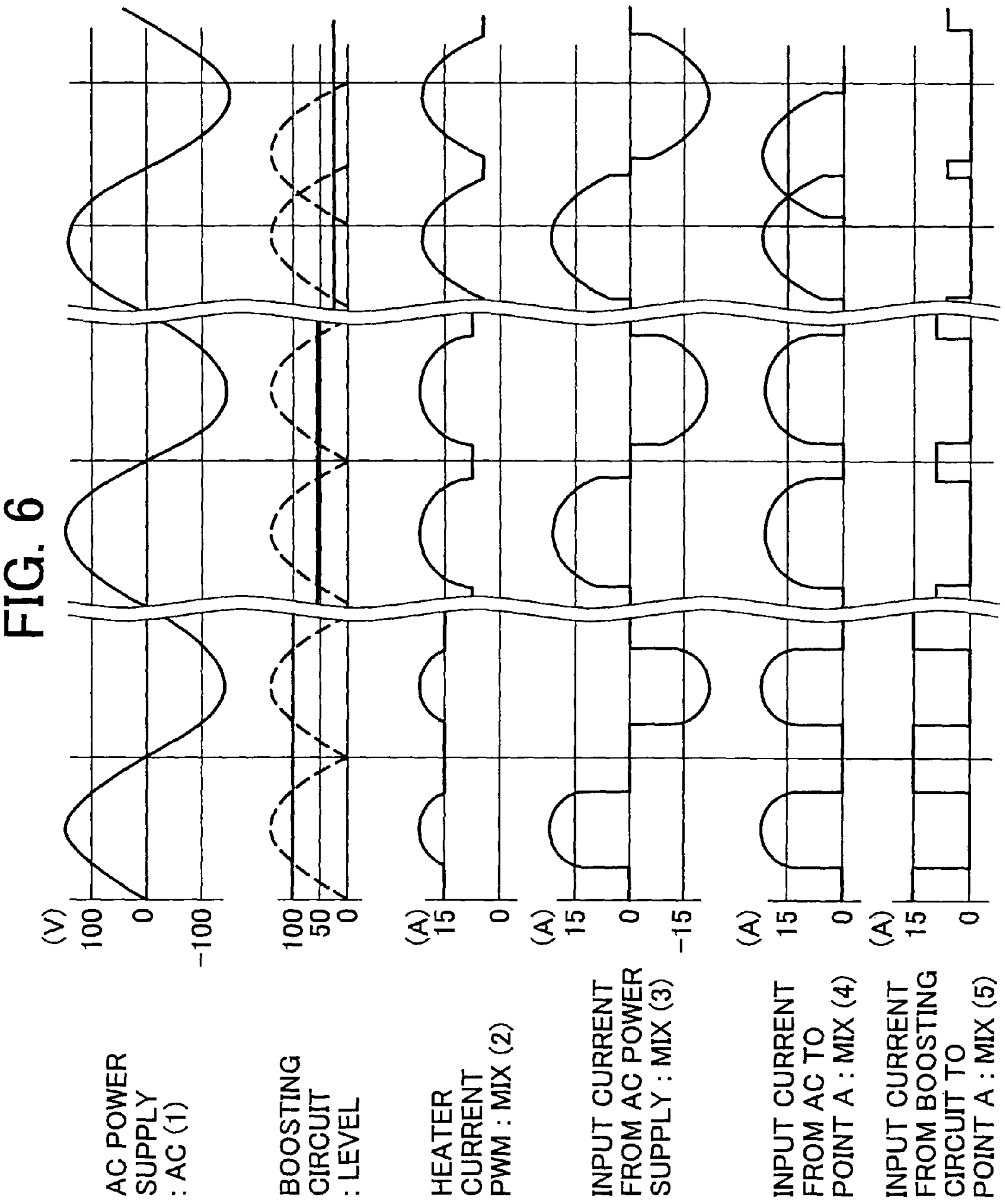
FIG. 6 is a schematic diagram of currents carried from a commercial power supply and an auxiliary power supply to a fixing heater.

FIG. 6 is an example of waveforms of the output of the boosting circuit and the current applied to the fixing heater HT1. In FIG. 6, the waveforms obtained when a PWM level of the boosting circuit is changed to 100%, 70%, and 20% while a PWM level of the voltage step-down circuit 207 is fixed.

The current MIX(5) input from the boosting circuit to the point A follows up the PWM level of the boosting circuit. Accordingly, if the PWM level of the boosting circuit is increased, the current from the battery element 202 included in the heater current MIX(2), i.e., the current MIX(2) applied to the fixing heater HT1 is increased. Conversely, the current MIX(3) input from the commercial power supply 200 to the digital copier is reduced to be lower than the current supplied when the power is supplied only from the commercial power supply 200. If the PMW level of the boosting circuit is reduced, the heater current MIX(2) is lower than the current MIX(3) and the power consumption of the digital copier is increased.

Figure 7A:
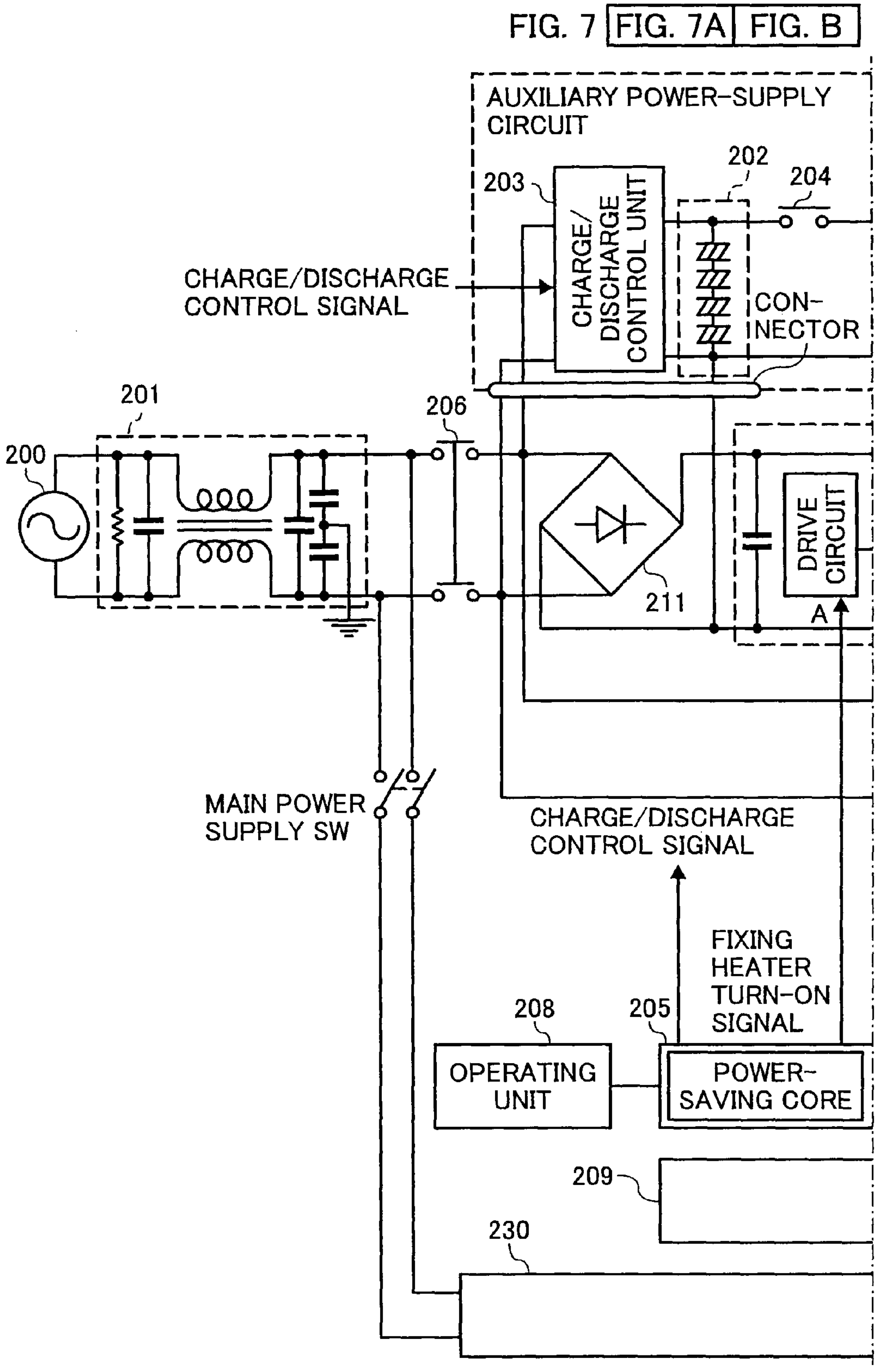
FIG. 7 is a schematic diagram of a control system centering around a fixing device in a digital copier according to a third embodiment of the present invention.
Figure 7B:
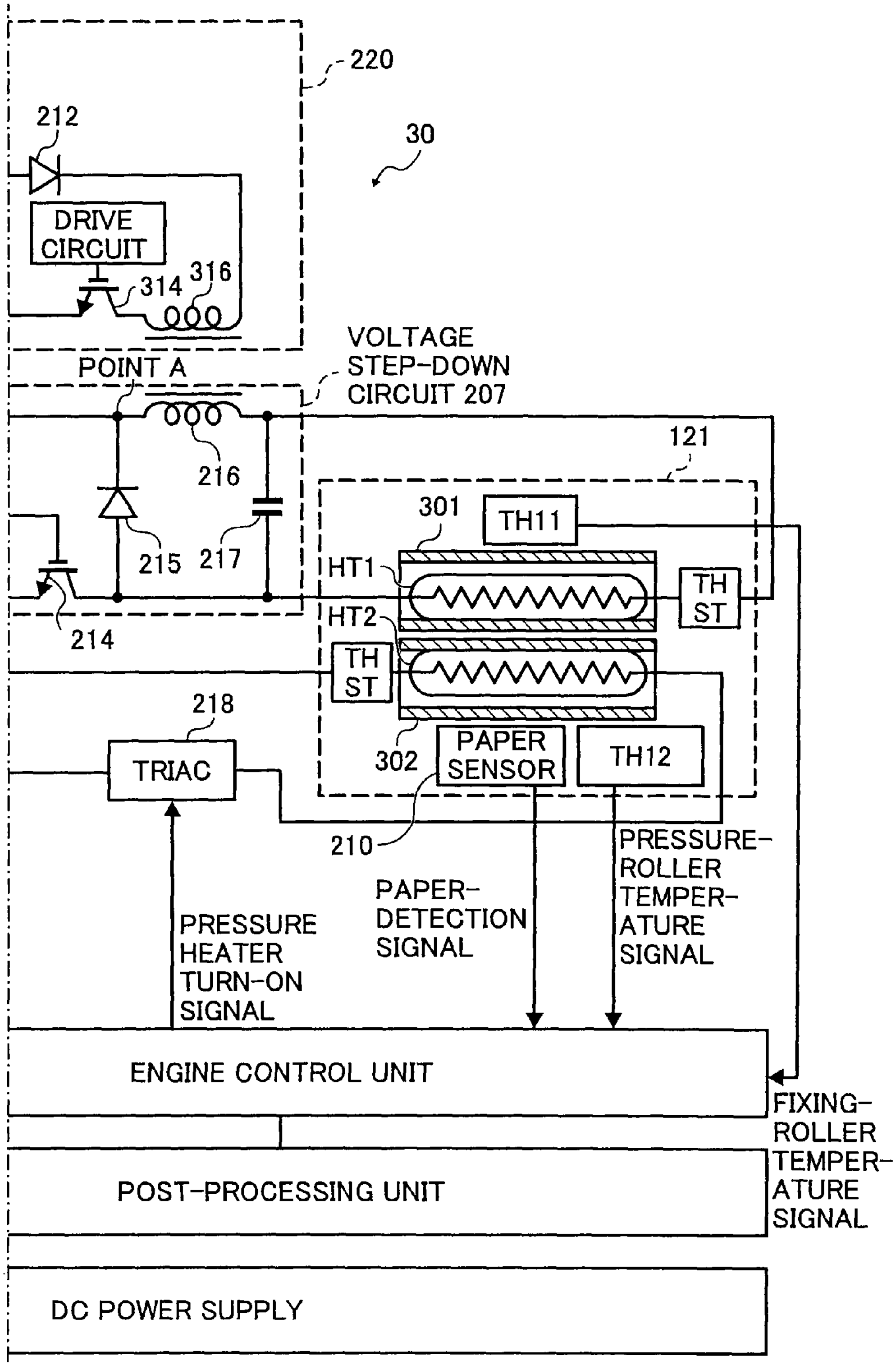

An image forming apparatus according to a third embodiment of the present invention will be explained with reference to FIG. 7. FIG. 7 is a block diagram of a control system 30 in the digital copier 1 serving as the image forming apparatus according to the third embodiment. In FIG. 7, the control system 30 mainly includes the fixing device 121. In the control system 30, the fixing device 121 includes the fixing heater HT1 of the fixing roller 301 that generates heat in response to supply of the power from the commercial power supply (AC power supply) 200 and the battery element 202 included in the auxiliary power-supply circuit 220.

Furthermore, the fixing device 121 includes the pressure heater HT2 that is provided at the pressure roller 302 and that generates heat in response to supply of the power from the commercial power supply 200. The DC voltage (DC power) is supplied to the fixing heater HT1 from the commercial power supply 200 through a heater turn-on circuit constituted by the relay 206 serving as the switching element, the rectifier 211, and the voltage step-down circuit 207. In addition, the DC voltage is supplied from the battery element 202 of the auxiliary power-supply circuit 220 charged by the commercial power supply 200 through the choke coil 216 of the voltage step-down circuit 207.

The auxiliary power-supply circuit 220 includes the charge-discharge control unit 203 for control charge and discharge. As the battery element 202, the electric double-layer capacitor, the ordinary capacitor, the primary battery or the like is used. The charge-discharge control unit 203 includes the charger that charges the battery element 202 in response to the supply of the AC voltage from the commercial power supply 200.

The power is supplied form the battery element 202 to the heater turn-on circuit through a discharge unit constituted by an auxiliary-power-supply output coil 316 arranged to be electromagnetically coupled to the choke coil 216 of the voltage step-down circuit 207, a switching element 314, and a drive circuit 317.

The control system 30 also includes the engine control unit 205 that operates at the power supplied from the DC power supply 230 and that control the entire digital copier or particularly the printer engine (not shown).

The engine control unit 205 is constituted by a microcomputer including such constituent elements (not shown) as a CPU, an ROM, and a RAM. The CPU is connected to the ROM that stores therein a program and data for controlling the digital copier. The CPU controls the printer engine, the commercial power supply 200, the auxiliary power-supply circuit 220, and the like based on the program stored in the ROM. In addition, the CPU stores various pieces of information on a control operation in the RAM.

The engine control unit 205 includes the power-saving core that controls the power consumption of the entire digital copier 1. The engine control unit 205 switches over the power between a power consumed by the respective constituent elements of the digital copier 1 and a power consumed by the engine control unit 205 according to a plurality of power-saving levels.

The engine control unit 205 controls an output of the voltage step-down circuit 207 of the heater turn-on circuit that connects the fixing heater HT1 to the commercial power supply 200 to be turned on or off. The engine control unit 205 thereby controls a current-carrying operation for carrying a current to the fixing heater HT1.

Moreover, the engine control unit 205 controls the triac 218 provided between the pressure heater HT2 and the commercial power supply 200 to be turned on or off, thereby controlling a current-carrying operation for carrying a current to the pressure heater HT2. The fixing device 121 includes safety thermostats THST.

The operating unit 208 and the post-processing unit 209 are connected to the engine control unit 205. The control system 30 includes the DC power supply 230 that generates a DC voltage (e.g., five volts or 24 volts) for control and driving used in each load of the digital copier 1. The DC power supply 230 receives the power from the commercial power supply 200 and generates the DC voltage. The fixing device 121 further includes the paper sensor 210 that detects passing of a sheet passing through between the fixing roller 301 and the pressure roller 302 of the fixing device 121.

The engine control unit 205 includes the power-supply selecting unit (not shown). The power-supply selecting unit selects one of the commercial power supply 200, the auxiliary power-supply circuit 220 including the battery element 202, and both the commercial power supply 200 and the auxiliary power-supply circuit 220 as the power supply for the heater turn-on circuit for carrying the current to one heater (fixing heater HT1). The engine control unit 205 includes a function of current-carrying control unit, i.e., power control unit that controls the power-supply selecting unit to make selection of the power based on the operation mode of the digital copier 1 or the temperature of the fixing device 121. In addition, the power control unit controls the addition time for which the power supplied from the auxiliary power-supply circuit 220 is added to the heater turn-on circuit including the voltage step-down circuit for turning on the fixing heater TH1.

The power-supply selecting unit selects the power supply that supplies the power to the fixing heater HT1 using the relay 204 driven to be turned on or off through the charge-discharge control unit 203. The function of the power control unit is mainly realized by causing the engine control unit 205 to execute a software program.

Figure 8:
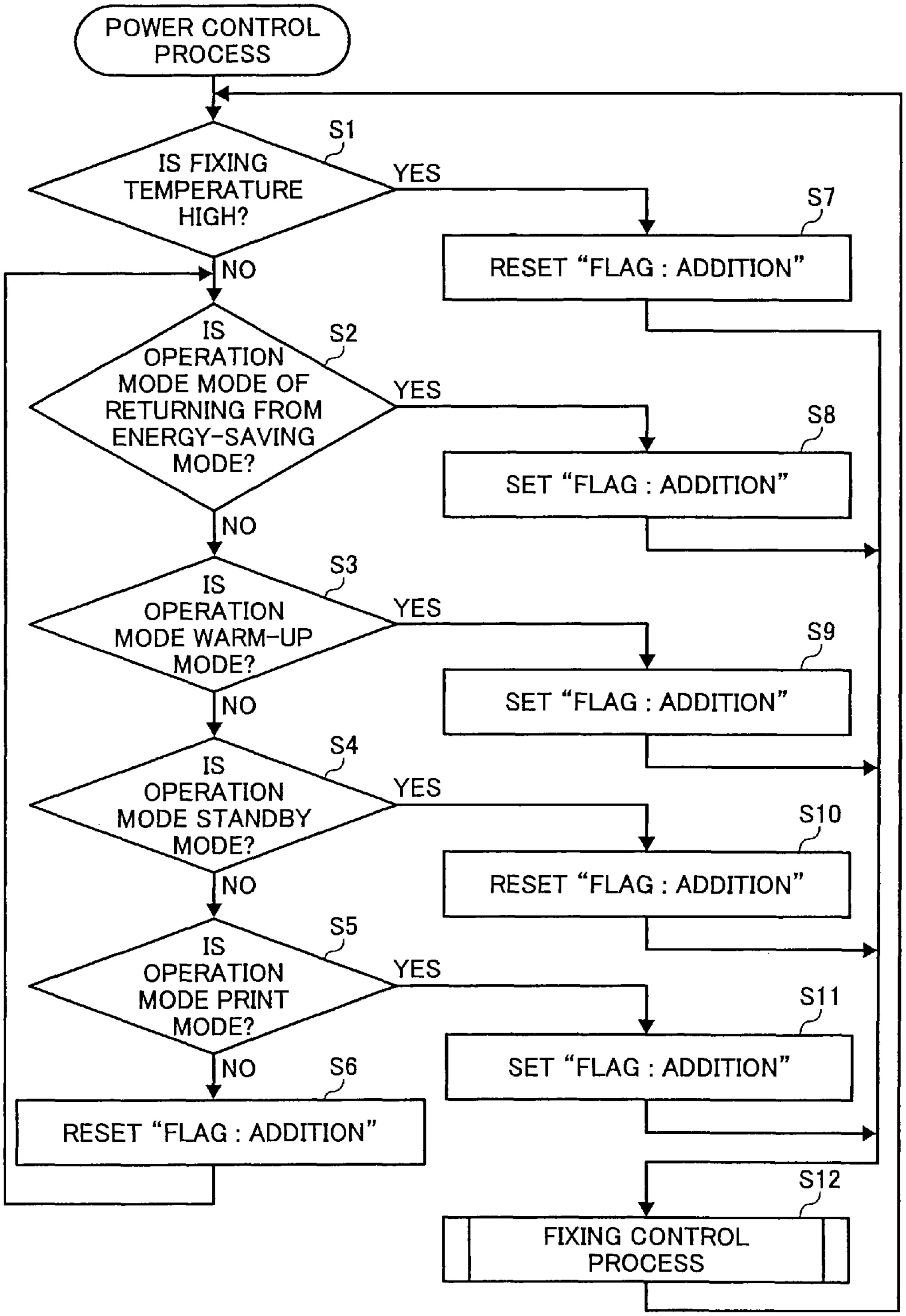
FIG. 8 is a flowchart of a processing procedure for a processing performed by a current-carrying control unit of an image forming apparatus according to the present embodiments.

A power control processing will next be explained. FIG. 8 is a flowchart of a processing procedure for a processing performed by the engine control unit 205. In the power control performed by the engine control unit 205, it is determined whether to add the power from the auxiliary power-supply circuit 220 as the power supply to the fixing heater HT1 based on the operation mode of the digital copier 1, and the temperature of the fixing heater HT1 is controlled.

At a step S1, the engine control unit 205 determines whether a fixing temperature is high by comparing the temperature of the fixing roller 301 detected by the thermistor TH1 and that of the pressure roller 302 detected by the thermistor TH2 with respective target temperatures. If the fixing temperature is high (step S1: Yes), then the engine control unit 205 resets "flag: addition" at a step S7, performs a fixing control processing at a step S12, and returns to the step S1.

If the fixing temperature is low (step S1: No), the engine control unit 205 determines whether the operation mode is a mode of returning from an power-saving mode. If the operation mode is the mode of returning from the power-saving mode (step S2: Yes), then the engine control unit 205 sets "flag: addition", performs the fixing control processing at the step S12, and returns to the step S1.

If the operation mode is not the mode of returning from the power-saving mode (step S2: No), then the engine control unit 205 determines whether the operation mode is a warm-up mode at a step S3. If the operation mode is not the warm-up mode (step S3: No), the engine control unit 205 determines whether the operation mode is a standby mode at a step S4. If the operation mode is the standby mode (step S4: Yes), then the engine control unit 205 sets the "flag: addition" at a step S10, performs the fixing control processing at the step S12, and returns to the step S1.

If the operation mode is not the standby mode (step S4: No), the engine control unit 205 determines whether the operation mode is a print mode at a step S5. If the operation mode is the print mode (step S5: Yes), then the engine control unit 205 sets the "flag: addition" at the step S11, and performs the fixing control processing at the step S12, and returns to the step S1. If the operation mode is not the print mode (step S5: No), then the engine control unit 205 rests the "flag: addition" at a step S6, and returns to the step S2.

In this way, the engine control unit 205 sets or resets the "flag: addition according to the mode of returning from the power-saving mode, the warm-up mode, the standby mode, or the print mode.

Figure 9A:
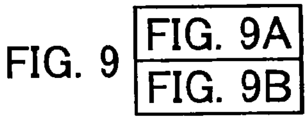
FIG. 9 is a flowchart of a processing procedure for a fixing control processing performed by the image forming apparatus according to the present embodiments.
Figure 9A:
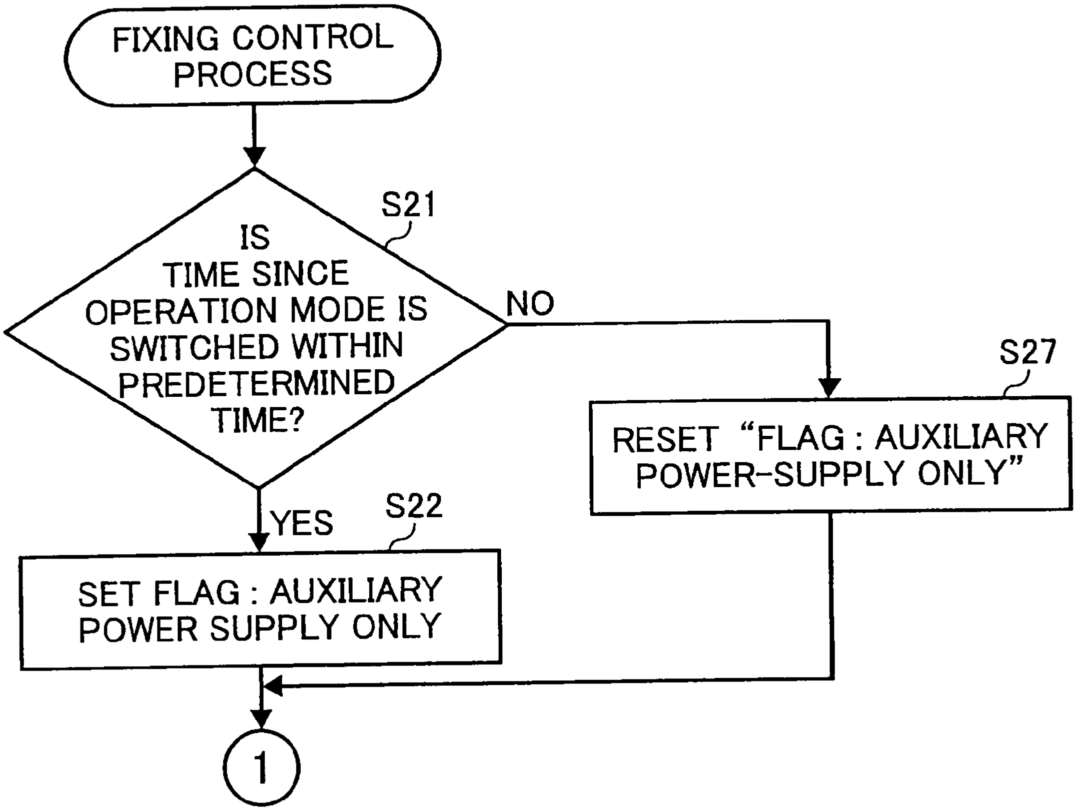
Figure 9B:
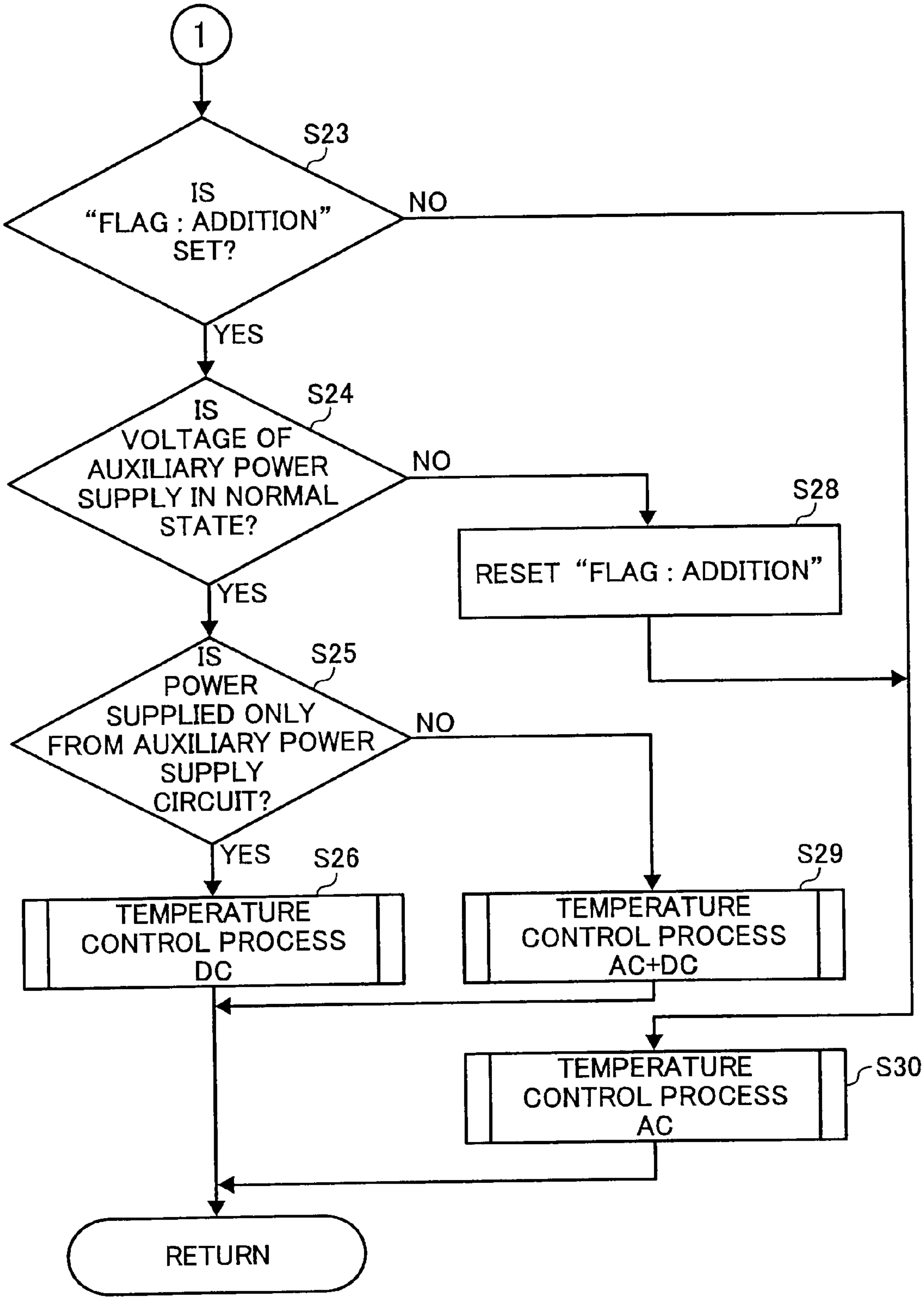

The fixing control processing performed by the engine control unit 205 will be explained. FIG. 9 is a flowchart of a processing procedure for the fixing control processing performed by the engine control unit 205.

At a step S21, the engine control unit 205 determines whether a time since the operation mode of the digital copier 1 is switched by "mode switching" is within a predetermined time. If the time is within the predetermined time (step S21: Yes), then the engine control unit 205 sets "flag: auxiliary power-supply only" at a step S22, and goes to a step S23. If the time is longer than the predetermined time (step S21: No), the engine control unit 205 resets the "flag: auxiliary power-supply only" at a step S27, and goes to the step S23.

In this manner, if both the power from the commercial power supply 200 and that from the auxiliary power-supply circuit 220 are to be used as the power supplied to the fixing heater HT1 in each operation mode, the power can be supplied only from the auxiliary power-supply circuit 220 for the predetermined time since the mode of the digital copier 1 is switched over to the operation mode.

The reason is as follows. Right after the mode is switched over, the inrush current is applied to the fixing heater HT1. Due to this, by stopping the supply of the power from the commercial power supply 200, and supplying the power to the fixing heater HT1 only from the battery element 202 of the auxiliary power-supply circuit 220 until the inrush current converges into a predetermined value, then the current input to the digital copier 1 can be leveled and flicker can be reduced.

Next, at the step S23, the engine control unit 205 determines whether to use the auxiliary power-supply circuit 220 by determining whether the "flag: addition" is set. If the "flag: addition" is not set (step S23: No), then the engine control unit 205 performs a processing "temperature control: AC" for supplying the power to the fixing heater HT1 only from the commercial power supply 200, and finishes the fixing control processing.

If the "flag: addition" is set (step S23: Yes), the engine control unit 205 determines whether the charged voltage of the battery element 202 is in a normal state in which the charged voltage is equal to or higher than a reference voltage necessary for the auxiliary power-supply circuit 220 to operate at a step S24. If the charged voltage of the battery element 202 is not the normal state (step S24: No), then the engine control unit 205 resets the "flag: addition" at a step S28, performs a processing "temperature control: AC" for supplying the power to the fixing heater HT1 only from the commercial power supply 200 at a step S30, and finishes the fixing control processing.

If the charged voltage of the battery element 202 is in the normal state (step S24: Yes), then the engine control unit 205 determines whether the power is supplied to the fixing heater HT1 only from the auxiliary power-supply circuit 220 at a step S25. If the power is supplied only from the auxiliary power-supply circuit 220 (step S25: Yes), then the engine control unit 205 performs a processing "temperature control: DC" at a step S26. If the power is not supplied only from the auxiliary power-supply circuit 220, that is, the power is supplied from both the commercial power supply 200 and the auxiliary power-supply circuit 220 (step S25: No), then the engine control unit 205 performs a processing "temperature control: AC+DC" at a step S29, and finishes the fixing control processing.

Each of the processings "temperature control: AC", "temperature control: DC", and "temperature control: AC+DC" is performed at predetermined intervals (e.g., intervals of 200 milliseconds) by a timer interruption processing in the engine control unit 205.

Each of the processings "temperature control: AC", "temperature control: DC", and "temperature control: AC+DC" will be explained.

The processing "temperature control: AC" (hereinafter, "temperature control process (AC)") will first be explained. In the temperature control process (AC), the power is supplied to the fixing heater HT1 only from the commercial power supply 200 through the voltage step-down circuit 207 to cause the fixing heater HT1 to generate heat. Specifically, the engine control unit 205 reads the voltage of the thermistor TH11 by the interruption processing at intervals of 200 milliseconds, and thereby detects the temperature of the fixing roller 301. The engine control unit 205 compares the temperature of the fixing roller 301 with the target temperature, and adjusts a fixing heater turn-on signal output to the voltage step-down circuit 207 so that the temperature of the fixing roller 301 falls within a predetermined value. The voltage step-down circuit 207 changes the output voltage supplied to the fixing heater HT1 according to the fixing heater turn-on signal.

Figure 10:
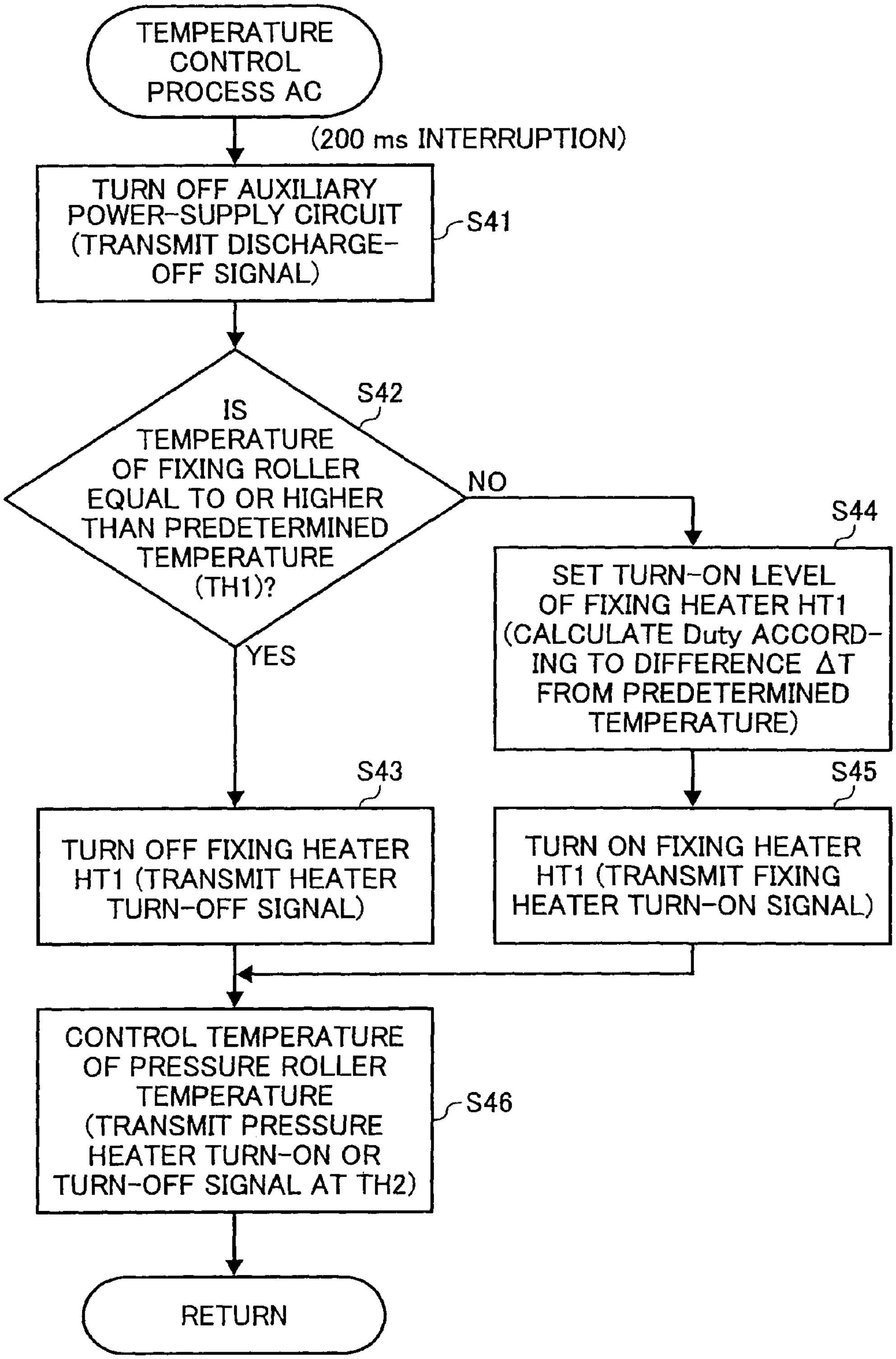
FIG. 10 is a flowchart of a processing procedure for a temperature control process (AC)

FIG. 10 is a flowchart of a processing procedure for the temperature control process (AC) performed by the engine control unit 205. First, the engine control unit 205 turns off the auxiliary power-supply circuit 220 by transmitting a discharge-OFF signal to the auxiliary power-supply circuit 220 (step S41). The engine control unit 205 determines whether the temperature of the fixing roller 301 is equal to or higher than a predetermined temperature (TH1) (step S42). If the temperature of the fixing roller 301 is equal to or higher than the predetermined temperature (TH1) (step S42: Yes), the engine control unit 205 stops supplying the power to the fixing heater HT1 by transmitting a fixing heater turn-off signal to the voltage step-down circuit 207 (step S43).

If the temperature of the fixing roller 301 is lower than the predetermined temperature (TH1) (step S42: No), the engine control unit 205 sets a turn-on level of the fixing heater HT1 (step S44). Specifically, the engine control unit 205 calculates an amount of the power supplied from the voltage step-down circuit 207 to the fixing heater HT1 according to the difference between the temperature of the fixing heater HT1 and the predetermined temperature (TH1). Thereafter, the engine control unit 205 supplies the power to the fixing heater HT1 by transmitting a fixing heater turn-on signal to the voltage step-down circuit 207 (step S45). Next, the engine control unit 205 stops or keeps supplying the power to the fixing heater HT1 by transmitting a pressure heater turn-on or turn-off signal to the voltage step-down circuit 207, thereby exercising the temperature control over the fixing device 121 (step S46).

The processing "temperature control: DC" (hereinafter, "temperature control process (DC)") will be explained. In the temperature control process (DC), the power is temporarily transmitted from the commercial power supply 200 to the fixing heater HT1 by as much as the power charged on the battery element 202 of the auxiliary power-supply circuit 220. The temperature of the fixing roller 301 is thereby controlled. Furthermore, as already explained, the auxiliary power-supply circuit 220 operates solely to supply the power to the fixing heater HT1 only for a limited time, i.e., when one operation mode is switched over to another operation mode or when the digital copier 1 is started. Due to this, the temperature control process (DC) is performed to be able to output the power by an amount corresponding to each operation mode. In the third embodiment, the auxiliary power-supply circuit 220 operates only for a predetermined time (e.g., three seconds) since the power-saving mode, the warm-up mode, or the print mode is started, the output amount is set equal.

Figure 11:
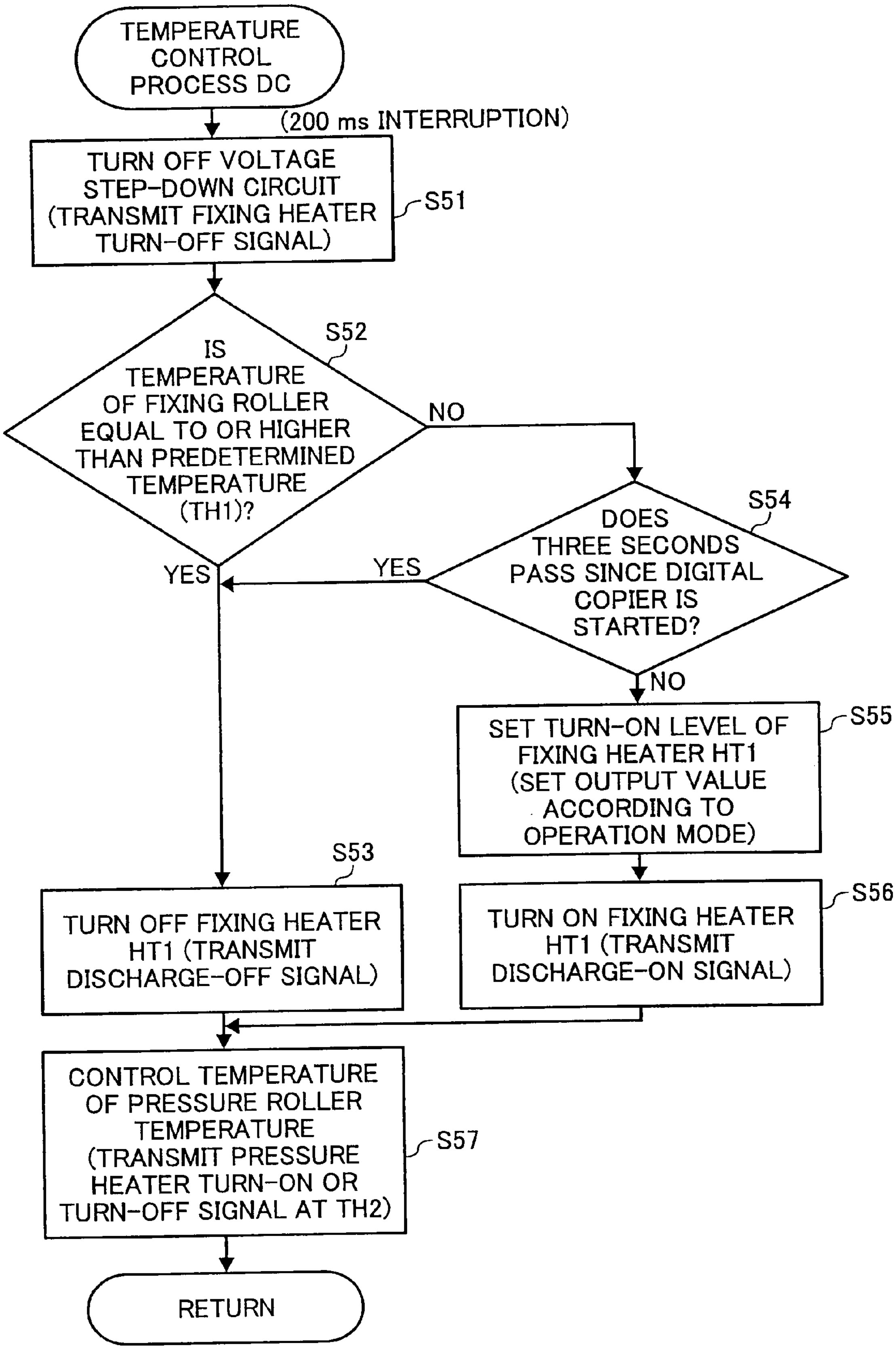
FIG. 11 is a flowchart of a processing procedure for a temperature control process (DC)

FIG. 11 is a flowchart of a processing procedure for the temperature control process (DC) performed by the engine control unit 205. First, the engine control unit 205 turns off the output of the voltage step-down circuit 207 by transmitting a fixing heater turn-off signal to the voltage step-down circuit 207 (step S51). The engine control unit 205 determines whether the temperature of the fixing roller 301 is equal to or higher than the predetermined temperature (TH1) (step S52). If the temperature of the fixing roller 301 is equal to or higher than the predetermined temperature (TH1) (step S52: Yes), the engine control unit 205 stops supplying the power to the fixing heater HT1 by transmitting a charge-discharge signal indicating discharge-OFF to the voltage step-down circuit 207 (step S53).

If the temperature of the fixing roller 301 is lower than the predetermined temperature (TH1) (step S52: No), the engine control unit 205 determines whether three seconds passes since the digital copier 1 is started (step S54). If three seconds passes since the digital copier 1 is started (step S54: Yes), the engine control unit 205 goes to the step S53.

If three seconds does not pass since the digital copier 1 is started (step S54: No), the engine control unit 205 sets the turn-on level of the fixing heater HT1 (step S55). Specifically, the engine control unit 205 sets the output value of the auxiliary power-supply circuit 220 according to the operation mode of the digital copier 1. The engine control unit 205 turns on the fixing heater HT1 by the set output value (step S56). The power is thereby supplied to the fixing heater HT1 only for three seconds since the digital copier 1 is started. Next, the engine control unit 205 turns on or off the pressure heater HT2 according to the temperature of the pressure roller 302 detected by the thermistor TH12 by transmitting the pressure-heater ON signal to the triac 218 to thereby control the temperature of the pressure roller 302 (step S57).

The processing "temperature control: AC+DC" (hereinafter, "temperature control process (AC+DC)") will be explained. The temperature control process (AC+DC) is a combination of the temperature control process (AC) and the temperature control process (DC). In the temperature control process (AC+DC), the power is supplied to the fixing heater HT1 from both the commercial power supply 200 and the auxiliary power-supply circuit 220, and the temperature of the fixing roller 301 is controlled. In this state, if the temperature of the fixing roller 301 is lower than a predetermined temperature ((target temperature) −5° C.), the power from the auxiliary power-supply circuit 220 as well as the power from the commercial power-supply circuit 200 is supplied to the fixing heater HT2.

Figure 12A:
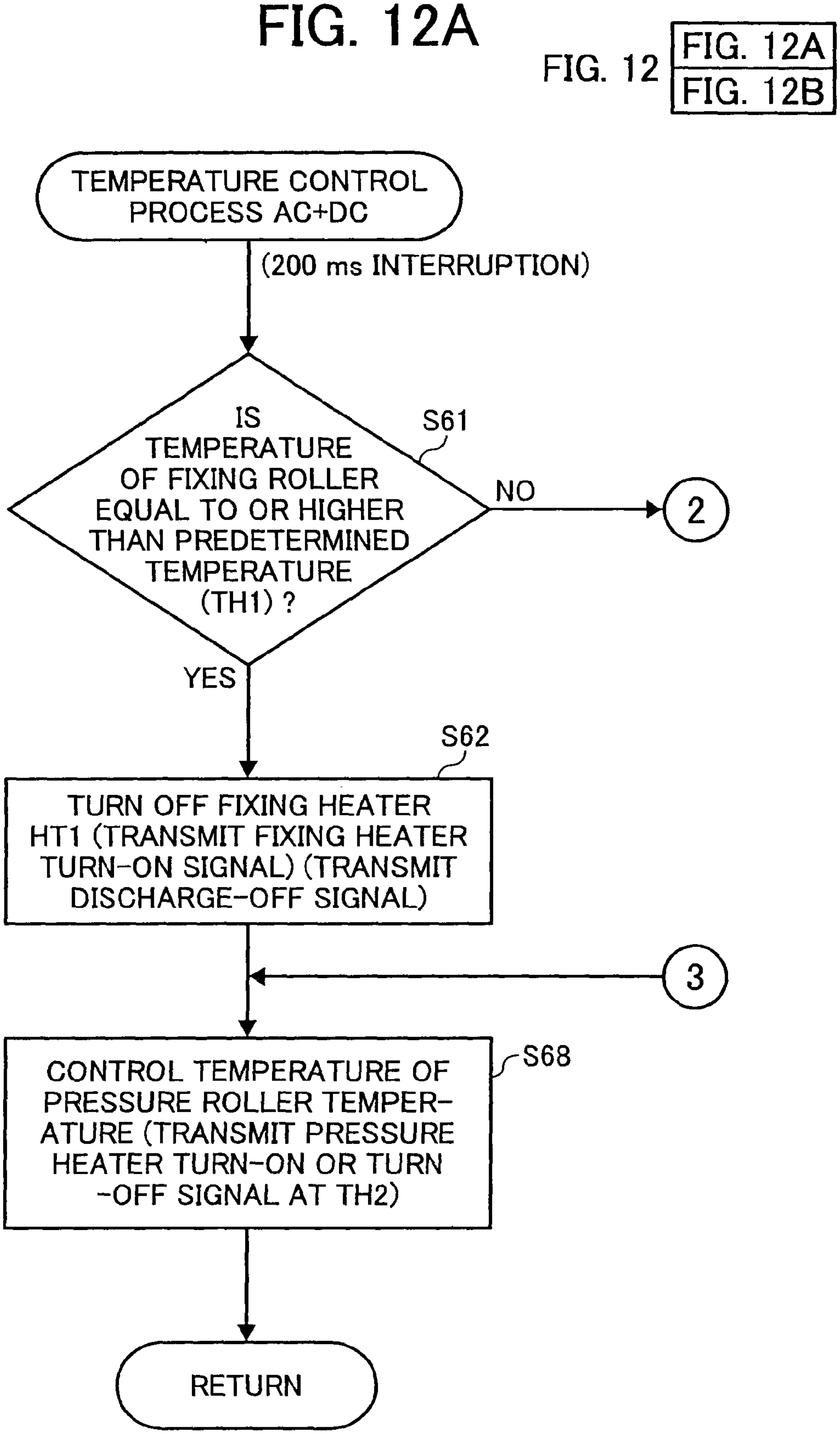
FIG. 12 is a flowchart of a processing procedure for a temperature control process (AC+DC)
Figure 12B:
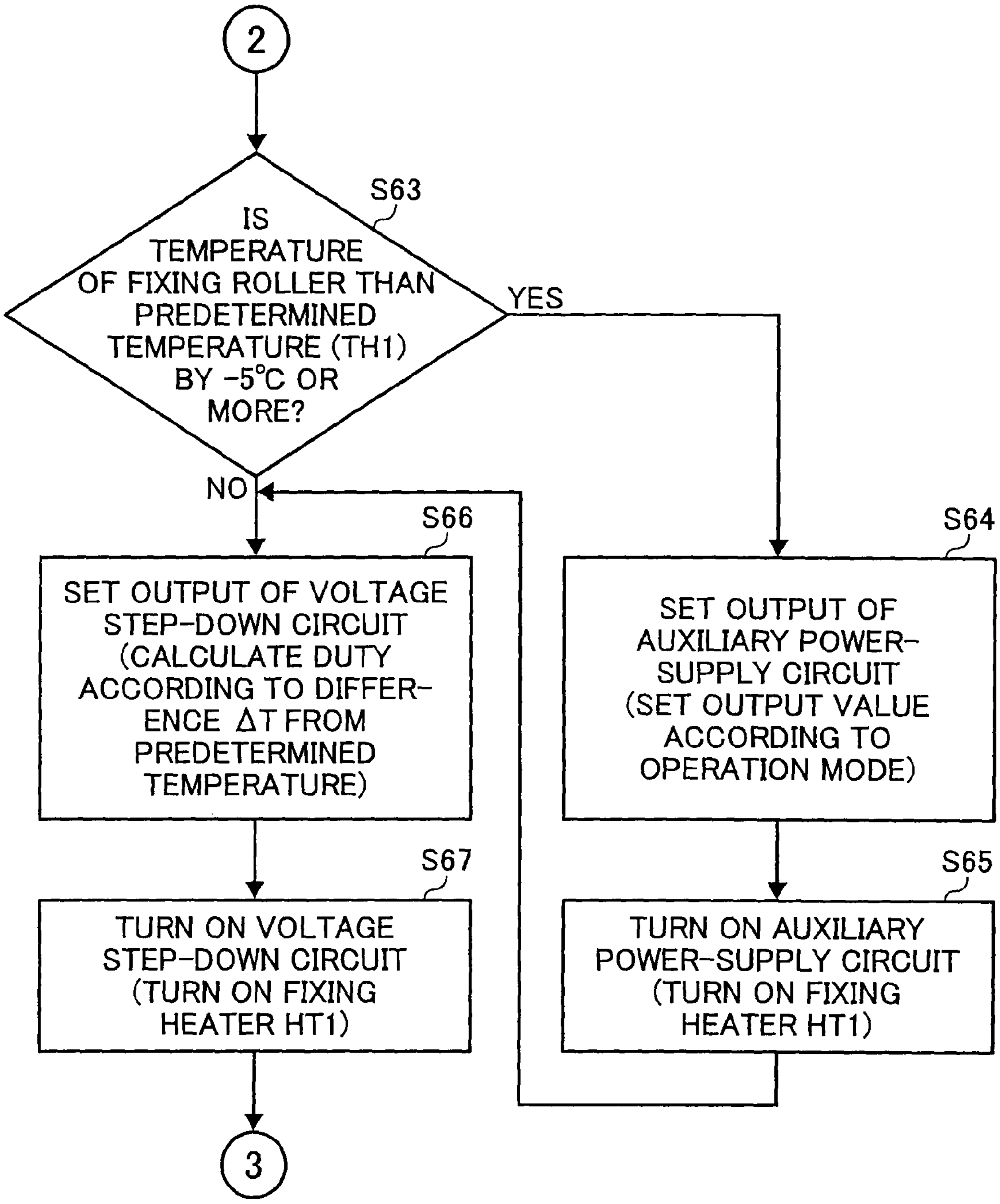

FIG. 12 is a flowchart of a processing procedure for the temperature control process (AC+DC) performed by the engine control unit 205. First, the engine control unit 205 determines whether the temperature of the fixing roller 301 is equal to or higher than the predetermined temperature (TH1) (step S61). If the temperature of the fixing roller 301 is equal to or higher than the predetermined temperature (TH1) (step S61: Yes), the engine control unit 205 turns off the output of the voltage step-down circuit 207 and that of the auxiliary power-supply circuit 220 by transmitting a fixing heater ON signal and a charge-discharge signal to the voltage step-down circuit 207 and the auxiliary power-supply circuit 220, respectively (step S62).

If the temperature of the fixing roller 301 is not equal to or higher than, i.e., lower than the predetermined temperature (TH1) (step S61: No), the engine control unit 205 determines whether the temperature of the fixing roller 301 is lower than the predetermined temperature (TH1) by the predetermined value (−5° C.) or more (step S63). If the temperature of the fixing roller 301 is lower than the predetermined temperature (TH1) by the predetermined value or more (step S63: Yes), the engine control unit 205 sets the output of the auxiliary power-supply circuit 220 (step S64). Thereafter, the engine control unit 205 turns on the output of the auxiliary power-supply circuit 220 and supply the power to the fixing heater HT1 (step S65).

Next, the engine control unit 205 sets the output of the voltage step-down circuit 207 that is the main power supply to the fixing heater HT1 (step S66), and turns on the output of the voltage step-down circuit 207 (step S67). As a result, the power from the auxiliary power-supply circuit 220 can be added to that from the voltage step-down circuit 207, and the resultant power can be supplied to the fixing heater HT1. Next, the engine control unit 205 supplies or stops supplying the power to the pressure heater HT2 by transmitting the pressure heater ON signal or pressure heater OFF signal to the triac 218 according to the temperature of the pressure roller 302 detected by the thermistor TH12 (step S68). The engine control unit 205 thereby controls the temperature of the pressure roller 302.

If the temperature of the fixing roller 301 is not lower than the predetermined temperature (TH1) by the predetermined value or more (step S63: No), the engine control unit 205 performs the processing at the step S66 and the following. The engine control unit 205 thereby controls the temperature of the pressure roller 302.

An instance in which the power is supplied to the fixing heater HT1 from the commercial (AC) power supply 200 will be explained. To supply the power to the fixing heater HT1 only from the commercial power supply 200, the relay 204 is turned off and the relay 206 is turned on. By so setting, the power is supplied only from the commercial power supply 200 to the voltage step-down circuit 207. The power supplied from the commercial power supply 200 is selected mainly when the digital copier 1 is active (performs a print operation). The AC voltage from the commercial power supply 200 is subjected to full-wave rectification by the rectifier 211 and input to the voltage step-down circuit 207.

The voltage step-down circuit 207 is a well-known chopper DC/DC converter and driven by the main switching element 214 arranged on the low side of the voltage step-down circuit 207. The voltage step-down circuit 207 includes the main switching element 214, the drive circuit, the choke coil 216, the rectifier 215 for commutation (flywheel), and the smoothing capacitor 217. The engine control unit 205 supplies a drive signal for driving the main switching element 214 to the voltage step-down circuit 207 through the drive circuit. Namely, the drive signal is the PWM signal the frequency of which is set to about 20 kilohertz far higher than the frequency of the commercial power supply 200.

The PWM signal makes a pulse width of an active-level pulse variable with the cycle of the pulse fixed. The amplitude of the voltage applied to the fixing heater HT1 can be changed to the desired amplitude in response to the PMW signal. In addition, the amount of heat generated in the fixing roller 301 is finally controlled in response to the PMW signal. In the voltage step-down circuit 207, the electrostatic capacity of the smoothing capacitor 217 arranged on the output side of the voltage step-down circuit 207 is set to a relatively low capacity. By so setting, the voltage step-down circuit 207 can output a voltage (fixing-heater current) having a waveform similar to the voltage input to the voltage step-down circuit 207.

Figure 13A:
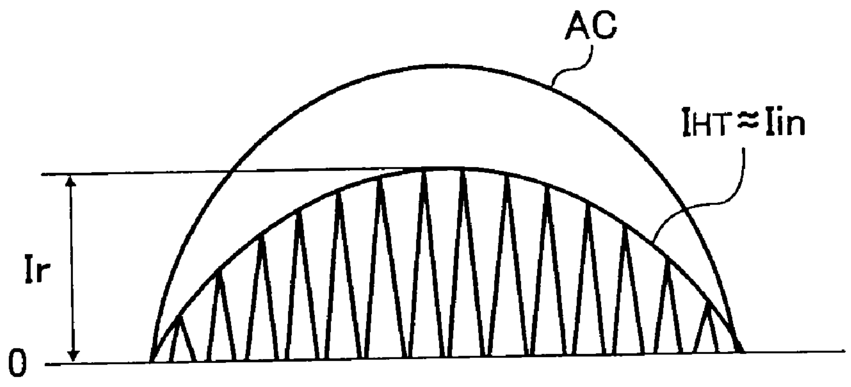
FIG. 13A is a schematic diagram of a current carried to a choke coil of a voltage step-down circuit.
Figure 13B:
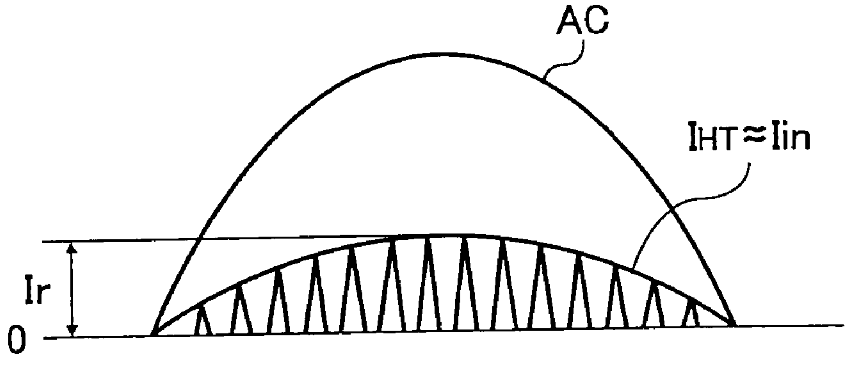
FIG. 13B is a schematic diagram of a current carried to the choke coil of the voltage step-down circuit.

FIGS. 13A and 13B are waveform views of a current $I_r$ carried to the choke coil 216 of the voltage step-down circuit 207 of the digital copier 1 in response to the PWM signal. The current $I_r$ is applied from the commercial power supply 200. The envelope of the current $I_r$ is of a sinusoidal wave shape similar to a voltage waveform AC of the commercial power supply 200.

By changing the level of the PWM signal according to the ON-OFF ratio of the main switching element 214, the amplitude of the sinusoidal wave can be changed. In the example of FIGS. 13A and 13B, the current $I_r$ is substantially equal in value to the input current to the digital copier 1.

Figure 14:
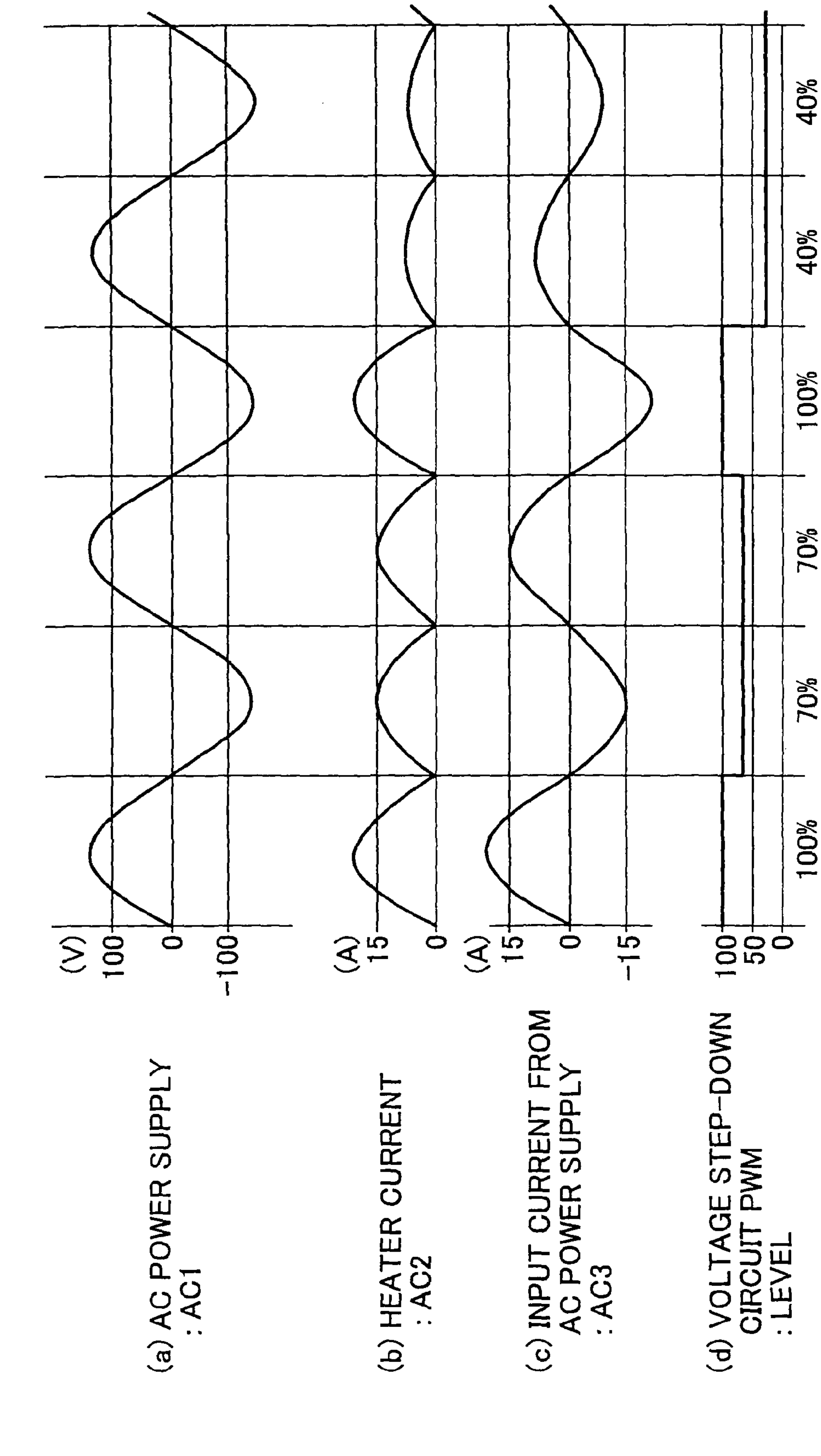
FIG. 14 is a schematic diagram of currents input to the image forming apparatus according to the present embodiments.

FIGS. 14A to 14D are waveform views of currents input to the fixing heater HT1 and the digital copier 1 if the level of the PWM signal is changed to 100%, 70%, and 40%. Specifically, FIG. 14A is a schematic diagram of the current output from the commercial (AC) power supply 200. FIG. 14B is a schematic diagram of the current applied to the fixing heater HT1. FIG. 13C is a schematic diagram of the current input to the digital copier 1 from the commercial (AC) power supply 200. FIG. 13D is a schematic diagram of an example of a change in the level of the PWM signal for driving the main switching element 214 of the voltage step-down circuit 207.

It is confirmed from FIGS. 14A to 14D that the currents input to the fixing heater HT1 and the digital copier 1 are changed to follow the PWM signal. If the level of the PWM signal is 100%, a highest current is applied to the fixing heater HT1. As a result, as shown in FIG. 14C, the current AC input to the digital copier 1 becomes the highest current.

An instance in which the power is supplied to the fixing heater HT1 from the battery element 202 of the auxiliary power-supply circuit 220, and an instance in which the power is supplied to the fixing heater HT1 from both the commercial power supply 200 and the auxiliary power-supply circuit 220 will be explained. When the power is supplied to the fixing heater HT1 from the auxiliary power-supply circuit 220 and the power is supplied to the fixing heater HT1 from both the commercial (AC) power supply 200 and the auxiliary power-supply circuit 220, the power is supplied to the fixing heater HT1 through the voltage step-down circuit from the auxiliary power-supply circuit 220 using the adding unit.

To efficiently add the voltage output from the auxiliary power-supply circuit 220 to the voltage output from the voltage step-down circuit 207, a switching operation for turning on or off the switching element 314 of the auxiliary power-supply circuit 220 is performed synchronously with a switching operation for turning on or off the main switching element 214 of the voltage step-down circuit 207. Namely, the switching element 314 is turned on synchronously with timing at which a current is carried from the commercial power supply 200 to the choke coil 216 to excite the choke coil 216 by turning on the main switching element 214.

Figure 15:
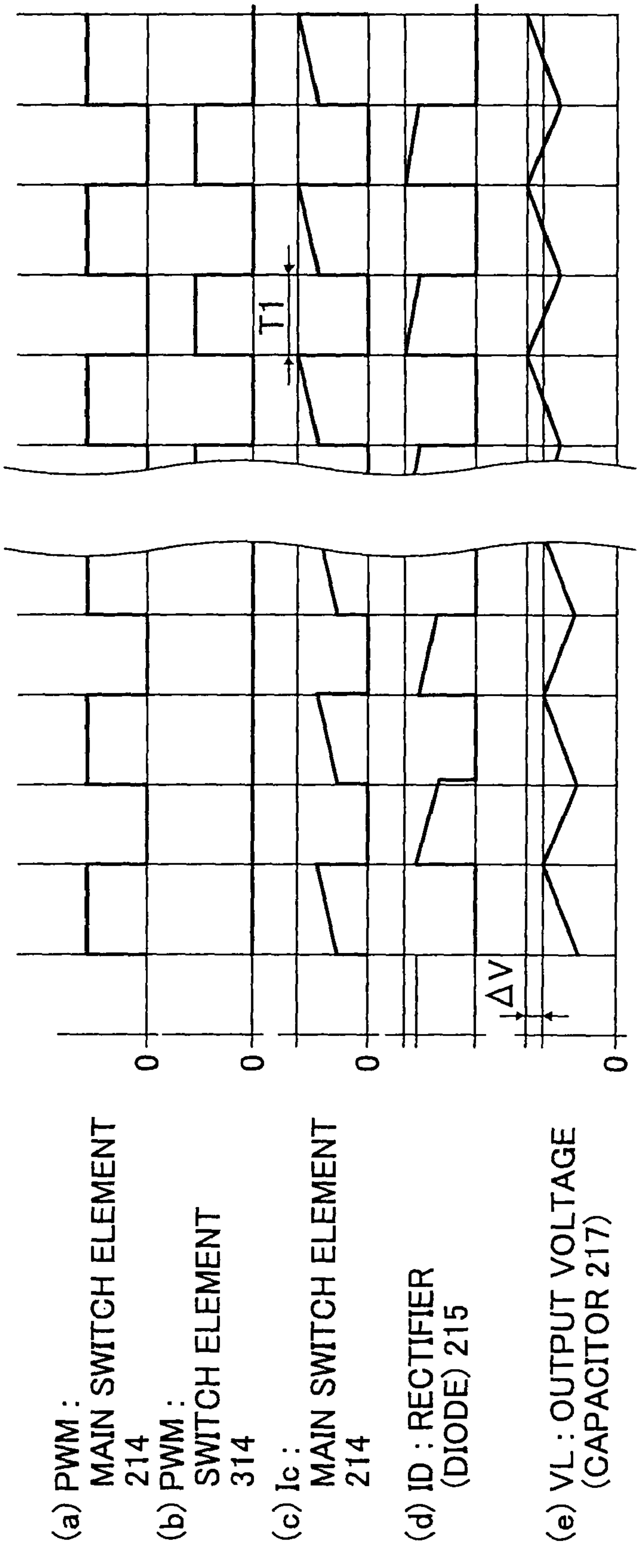
FIG. 15 is a schematic diagram of operation waveforms of the voltage step-down circuit in the image forming apparatus according to the present embodiments.

FIG. 15 is a schematic diagram of operation waveforms of the voltage step-down circuit 207 in the digital copier 1. In FIG. 15, a waveform part is divided into a left-half waveform part and a right-half waveform part at a view-omitted part set as a boundary. In a period corresponding to the left-half waveform part, the voltage output from the auxiliary power-supply circuit 220 is not added to the voltage output from the voltage step-down circuit 207, i.e., only the commercial power supply 200 operates. In this period, the PWM signal for driving the switching element 314 is not transmitted from the engine control unit 205, thereby turning off the auxiliary power-supply circuit 220.

In this case, when the main switching element 214 is turned on by transmitting the PWM signal from the engine control unit 205, a collector current Ic of the main switch circuit 214 is applied to excite the choke coil 216, and the voltage is output to the fixing heater HT1 serving as the load. When the main switching element 214 is turned off, energy of a core of the choke coil 216 is emitted through the rectifier 215 for the commutation (flywheel), and a diode current ID is carried across the voltage step-down circuit 207.

On the other hand, in a period corresponding to the left-half waveform part of FIG. 15, the voltage output from the auxiliary power-supply circuit 220 is added to the voltage output from the voltage step-down circuit 207. The PWM signal for turning on the switching element 314 for driving the auxiliary-power-supply output coil 316 is output to the auxiliary power-supply circuit 220 from the engine control unit 205 synchronously with the timing at which the main switching element 214 of the voltage step-down circuit 207 is turned off. As a result, the choke coil 216 is excited synchronously with excitation of the auxiliary-power-supply output coil 316 during commutation. The power supplied from the commercial power supply 200 and that supplied from the auxiliary power-supply circuit 220 are added up, and the resultant power is supplied to the fixing heater HT1. An increment ΔV of the output voltage obtained by the addition can be set to a desired value by changing a pulse width T1 of the PWM signal for turning on or off the switching element 314.

Consequently, the excitation of the auxiliary-power-supply output coil 316 generated by the current carried from the battery element 202 to the auxiliary-power-supply output coil 316 and the excitation of the choke coil 216 generated by the current carried from the commercial power supply 200 to the choke coil 216 are added up. The power is, therefore, supplied to the fixing heater HT1 serving as the load of the voltage step-down circuit 207 from both the commercial power supply 200 and the auxiliary power-supply circuit 220. If the power is supplied to the fixing heater HT1 only from the auxiliary power-supply circuit 220, the main switching element 214 is turned off.

The magnetic coupling between the choke coil 216 of the voltage step-down circuit 207 and the auxiliary-power-supply output coil 316 of the auxiliary power-supply circuit 220 can be realized by winding the auxiliary-power-supply output coil 316 around the core of the choke coil 216. However, as explained in the third embodiment, it is possible to magnetically couple the choke coil 216 of the voltage step-down circuit 207 to the auxiliary-power-supply output coil 316 of the auxiliary power-supply circuit 220 only by providing the core of the auxiliary-power-supply output coil 316 to face up to the choke coil 216. This magnetic coupling is a well-known technique for noncontact power supply. A magnetic flux generated by the auxiliary-power-supply output coil 316 is linked with the core of the choke coil 216, thereby supplying the power to the fixing heater HT1.

Figure 16A:
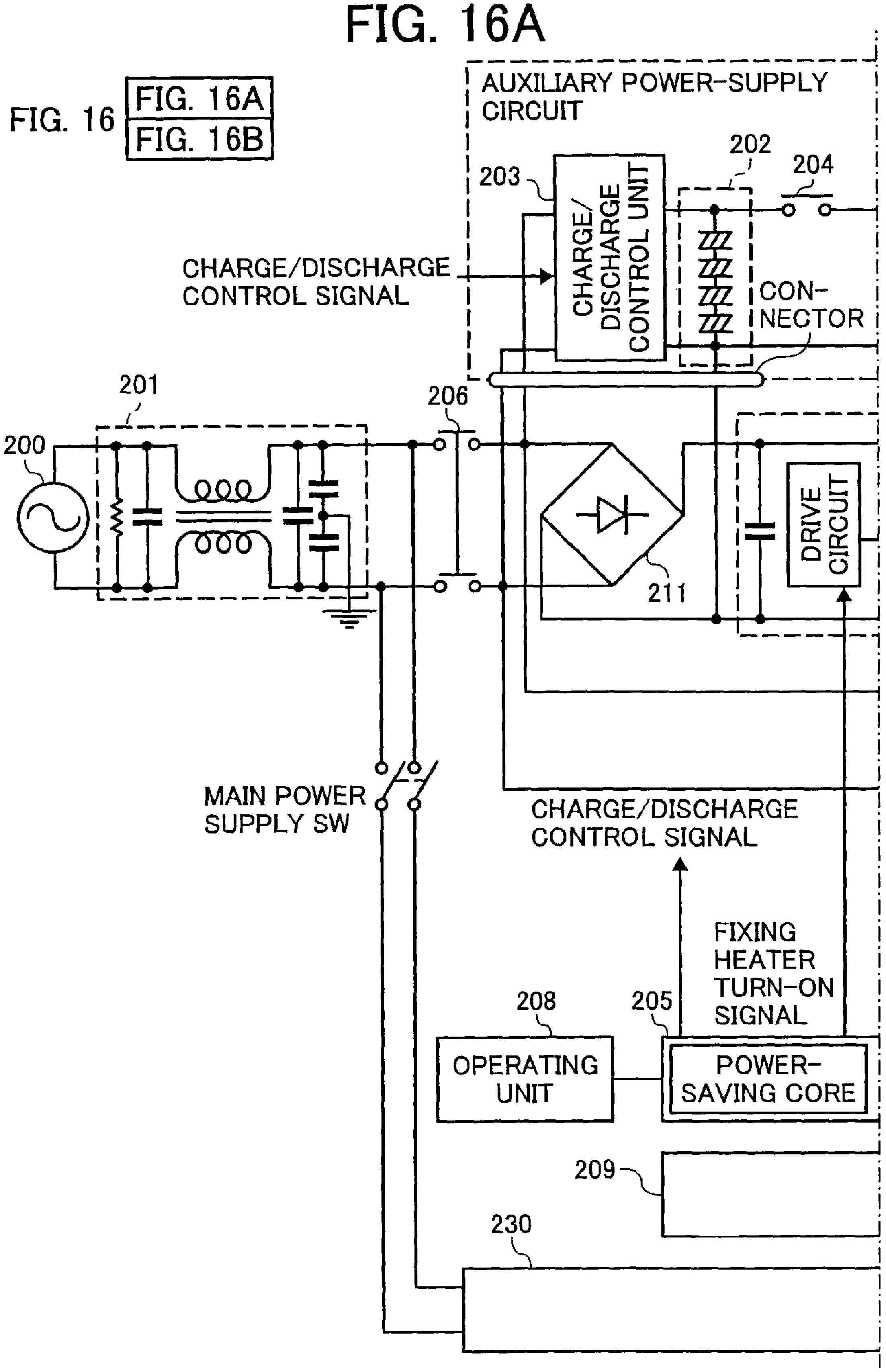
FIG. 16 is a schematic diagram of a control system centering around a fixing device in an image forming apparatus according to a fourth embodiment of the present invention.
Figure 16B:
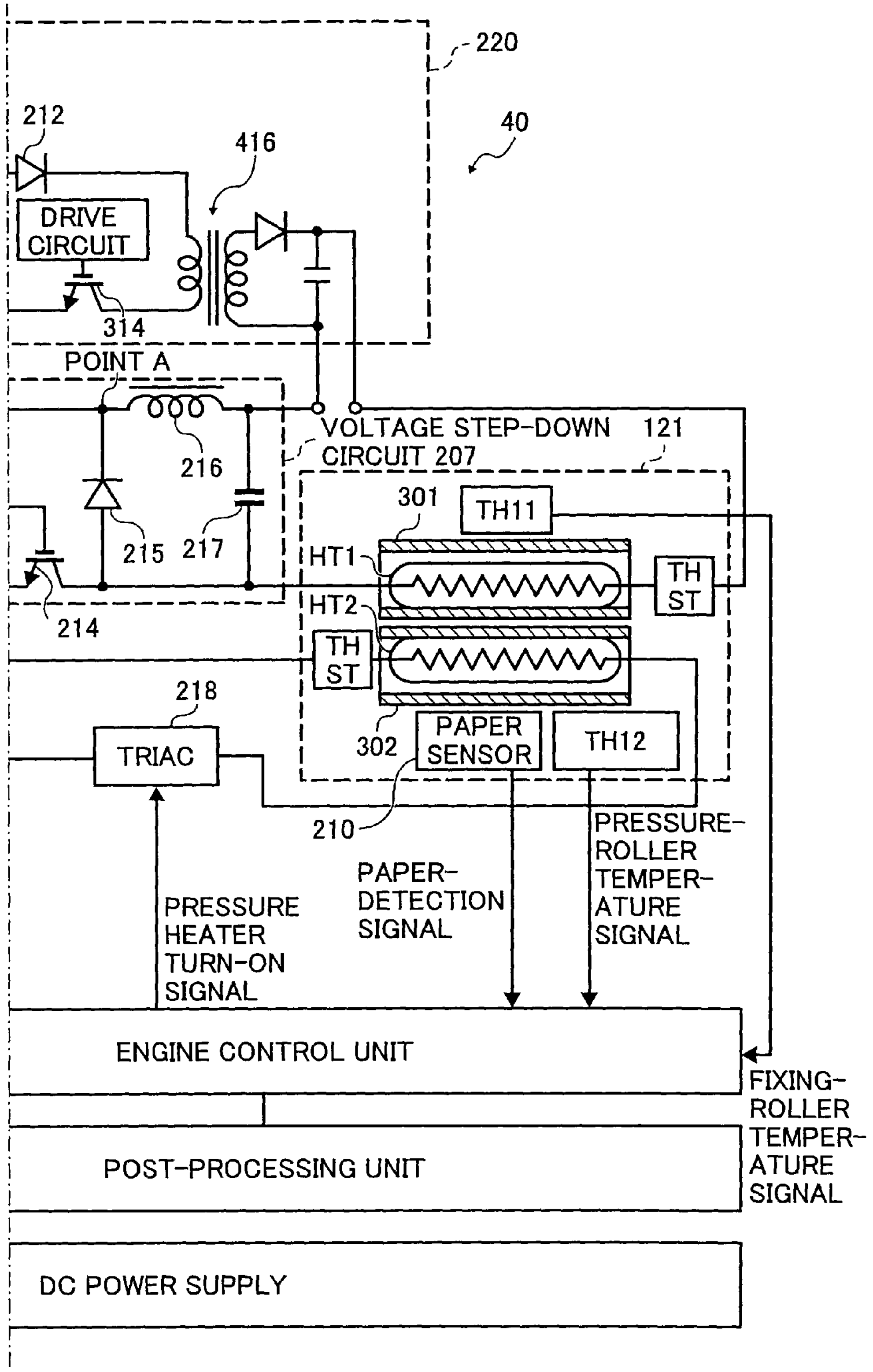
Figure 20:
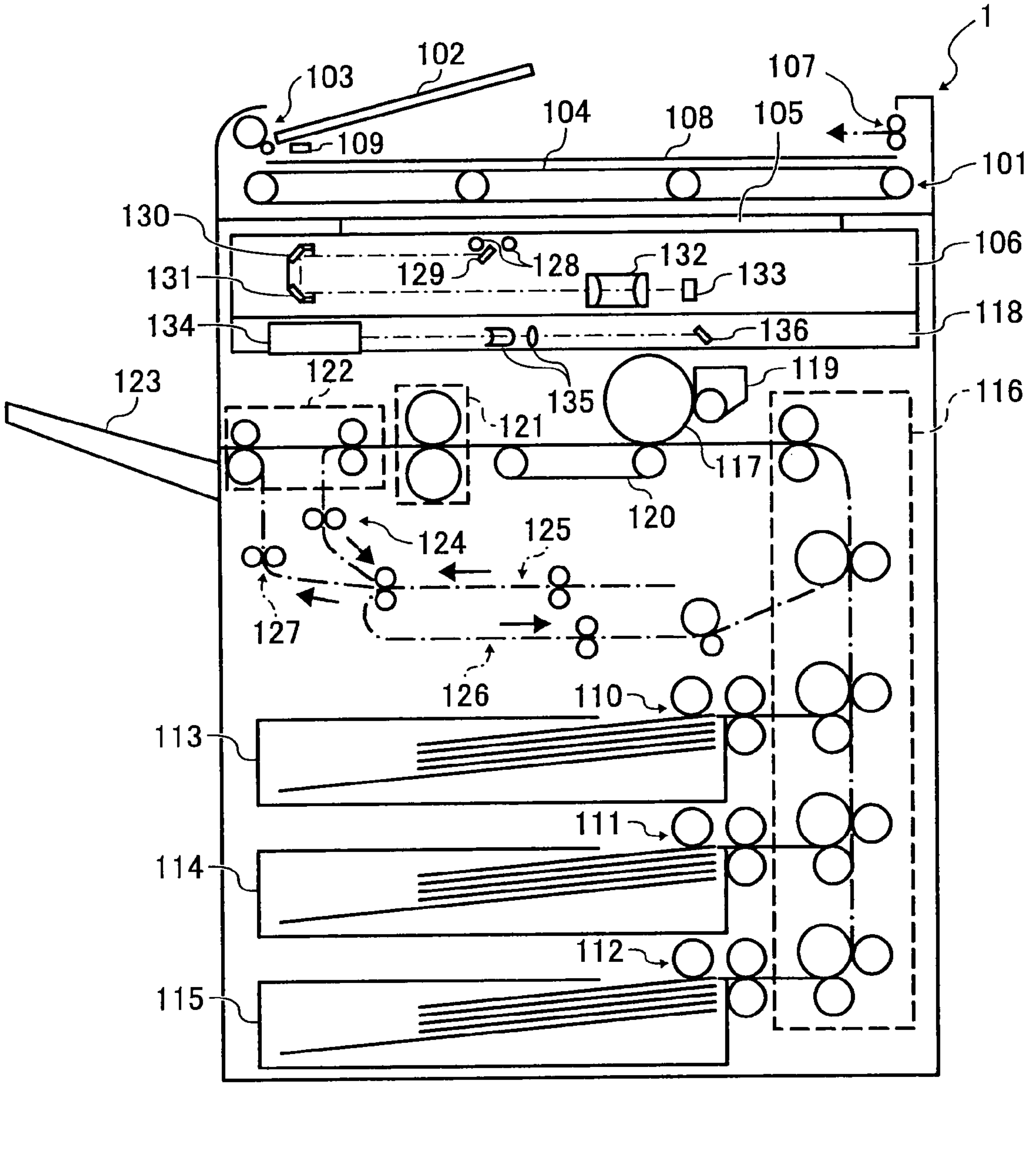
FIG. 20 is a longitudinal front view of an image forming apparatus according to the present embodiments.

An image forming apparatus according to a third embodiment of the present invention will be explained with reference to FIG. 16. FIG. 16 is a block diagram of a control system 40 in the digital copier 1 serving as the image forming apparatus according to the fourth embodiment. In FIG. 16, the same constituent elements as those shown in FIG. 7 are denoted by the same reference symbols and will not be repeatedly explained. The digital copier 1 according to the fourth embodiment is shown in FIG. 20 to be explained later.

In the control system 40 mainly including the fixing device 121 according to the fourth embodiment, the power output from the voltage step-down circuit 207 is added to the power supplied from the auxiliary power-supply circuit 220. To do so, adding unit for connecting a secondary coil of a boosting-step-down transformer 416 of the auxiliary power-supply circuit 220 in series to the output of the voltage step-down circuit 207 is provided. The resultant power is supplied to the fixing device 121. Furthermore, the main switching element 214 of the voltage step-down circuit 207 and the switching element 314 of the auxiliary power-supply circuit 220 operate independently of each other.

Figure 17A:
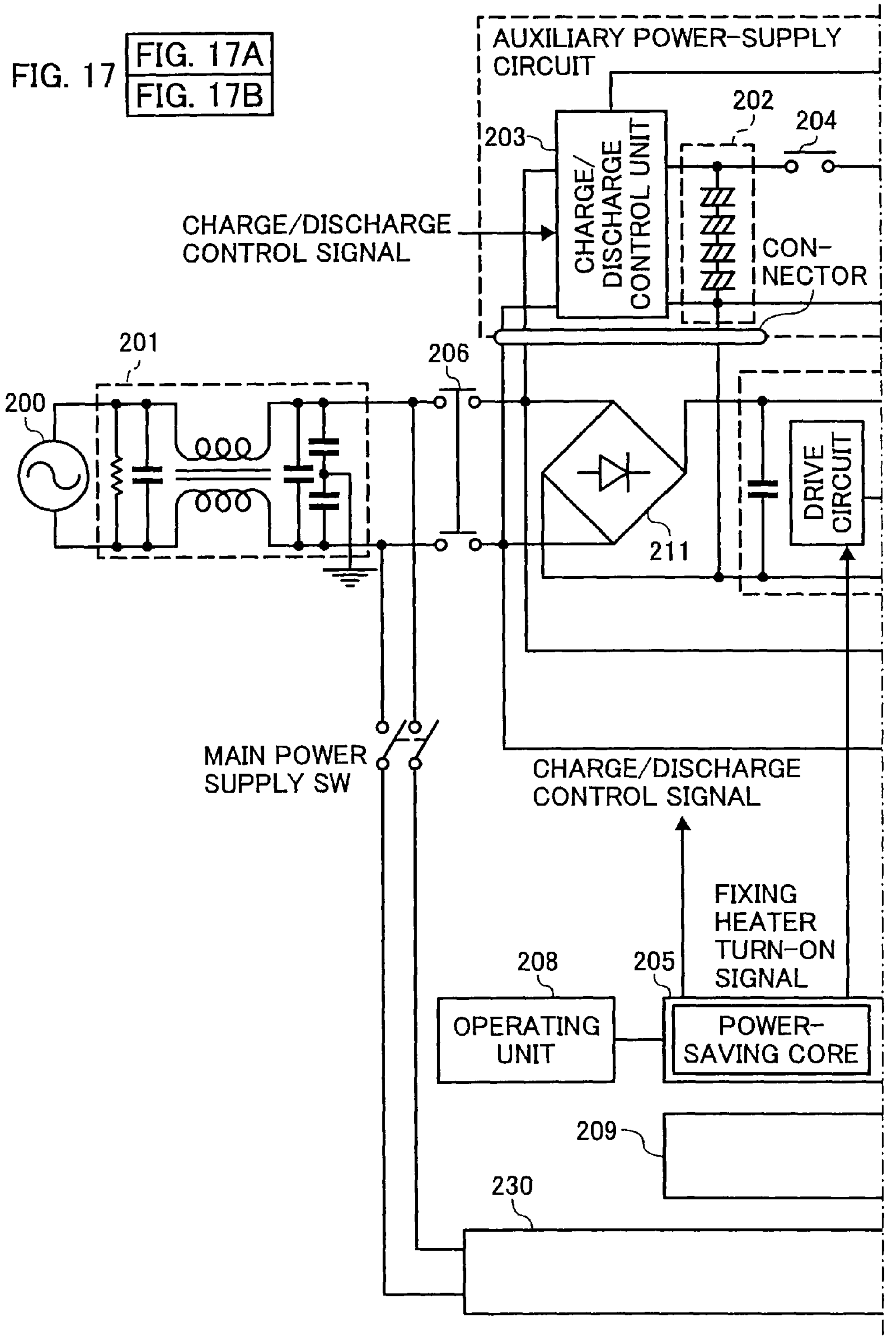
FIG. 17 is a schematic diagram of a control system centering around a fixing device in an image forming apparatus according to a fifth embodiment of the present invention.
Figure 17B:
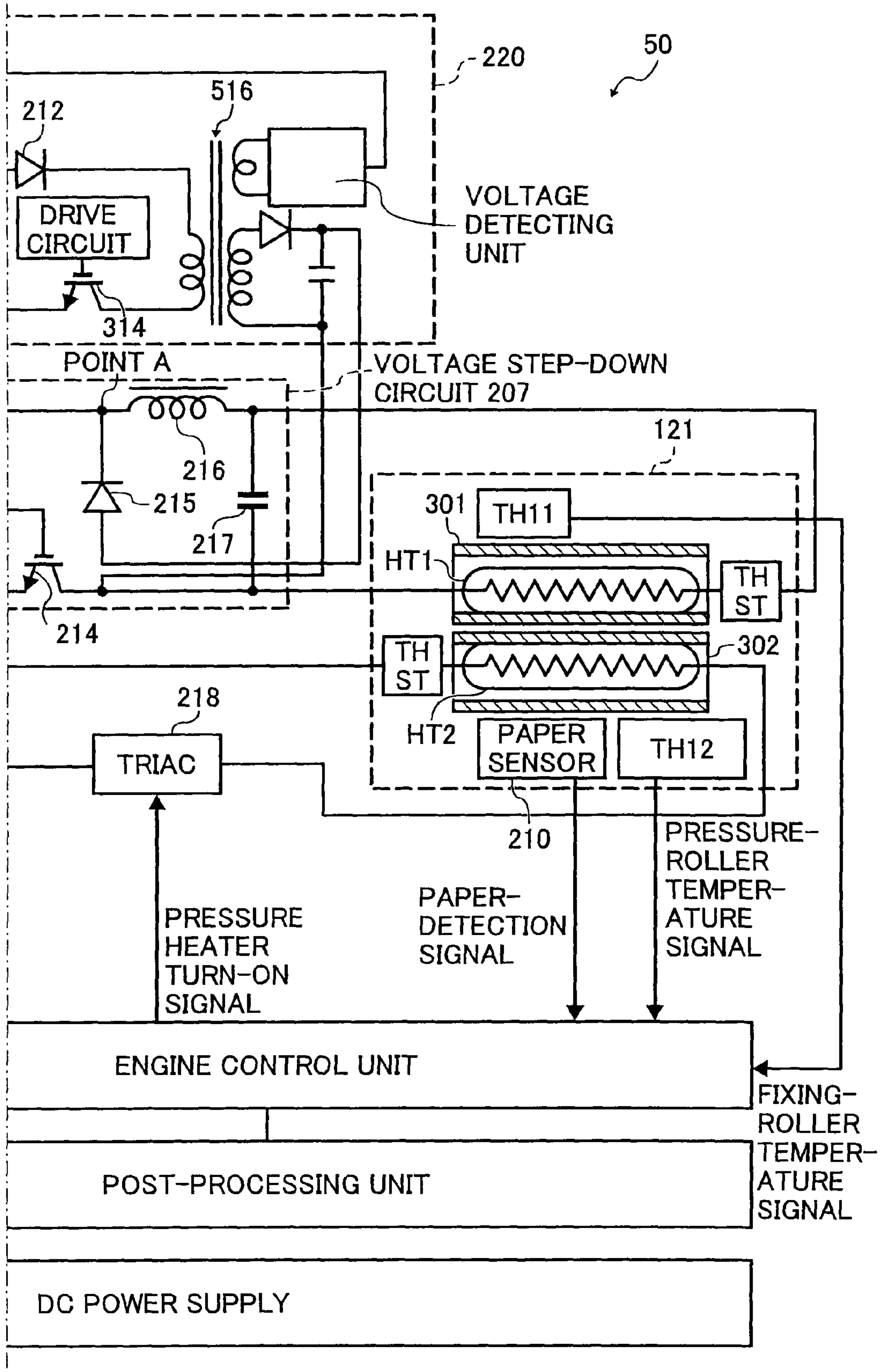

An image forming apparatus according to a fifth embodiment of the present invention will be explained. FIG. 17 is a block diagram of a control system 50 in the digital copier 1 serving as the image forming apparatus according to the fifth embodiment. In FIG. 17, the same constituent elements as those shown in FIG. 7 are denoted by the same reference symbols and will not be repeatedly explained. The digital copier 1 according to the fifth embodiment is shown in FIG. 20 to be explained later.

The control system 50 mainly including the fixing device 121 according to the fifth embodiment is characterized by providing the adding unit for connecting the output of the auxiliary power-supply circuit 220 in series to the rectifier 215 for the commutation (flywheel diode) of the voltage step-down circuit 207. Similarly to the third embodiment shown in FIG. 7, the power supplied from the auxiliary power-supply circuit 220 is added to the power supplied from the commercial power supply 200 in the period in which the main switching element 214 of the voltage step-down circuit 207 for controlling the power from the commercial power supply 200 is turned off.

Figure 18A:
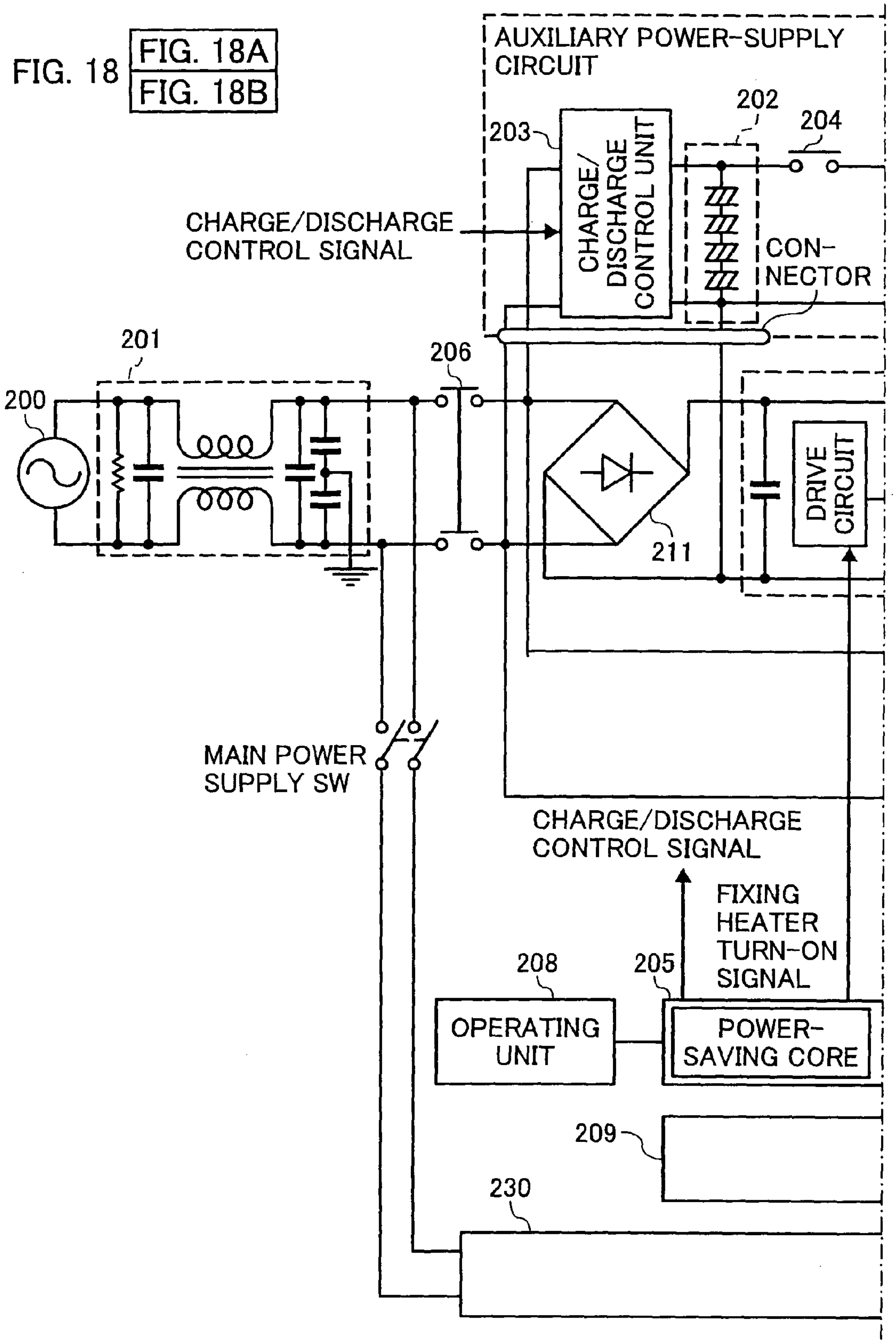
FIG. 18 is a schematic diagram of a control system centering around a fixing device in an image forming apparatus according to a sixth embodiment of the present invention.
Figure 18B:
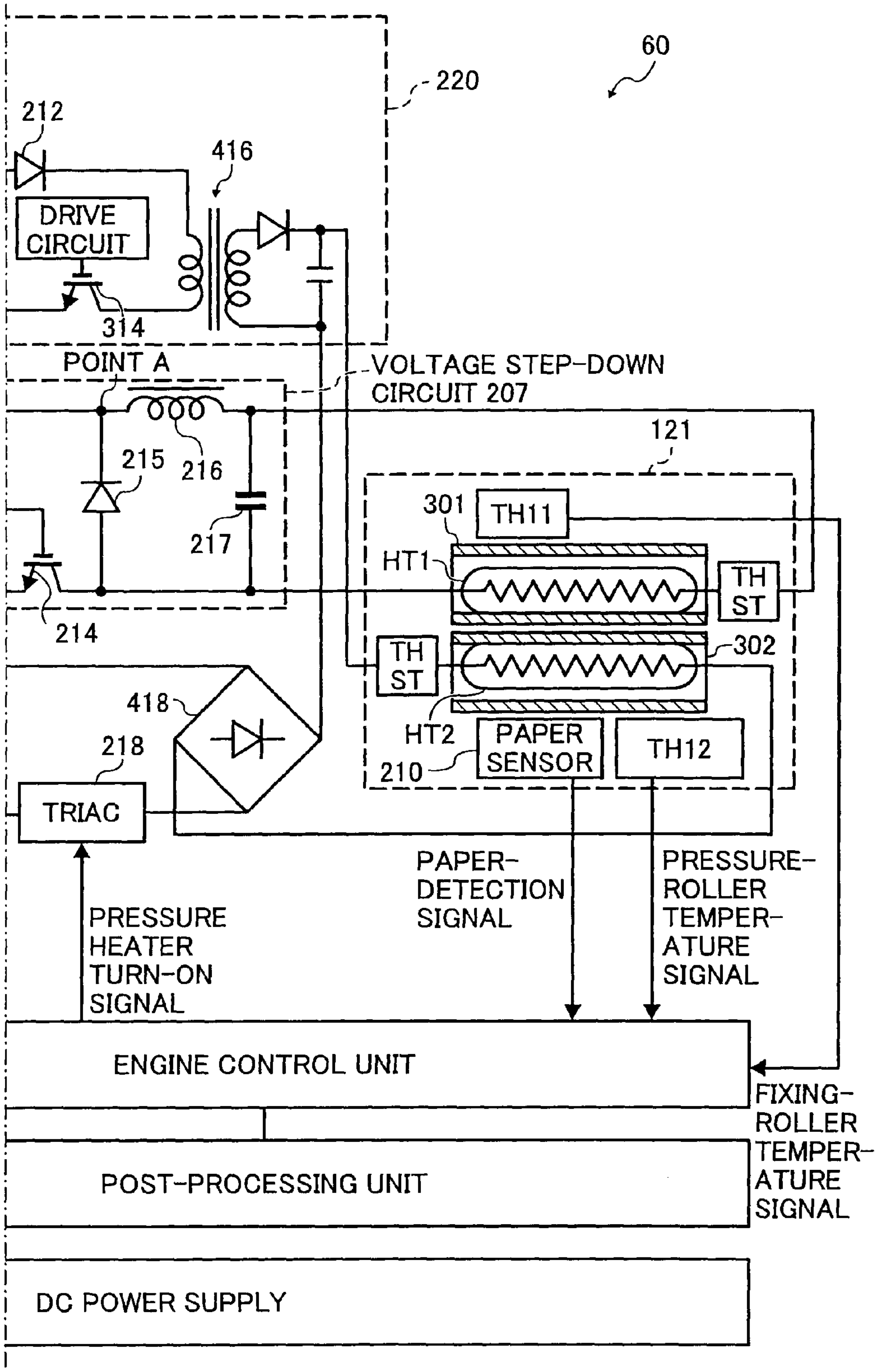

An image forming apparatus according to a sixth embodiment of the present invention will be explained with reference to FIG. 18. FIG. 18 is a block diagram of a control system 60 in the digital copier 1 serving as the image forming apparatus according to the sixth embodiment. In FIG. 18, the same constituent elements as those shown in FIGS. 7, 16, and 17 are denoted by the same reference symbols and will not be repeatedly explained. The digital copier 1 according to the sixth embodiment is shown in FIG. 20 to be explained later.

The control system 60 mainly including the fixing device 121 according to the sixth embodiment is characterized by causing a heater system directly driven by the commercial power supply 200 (without via voltage converting unit) to add up the power supplied from the commercial power supply 200 and the power supplied from the auxiliary power-supply circuit 220 and to supply the resultant power to the fixing device 121. Namely, adding unit for connecting the auxiliary power-supply circuit 220 in series to the pressure heater HT2 included in the pressure roller 302 to which the power is supplied from the commercial power supply 200 through the triac 218 is provided.

The power is supplied from the auxiliary power-supply circuit 220 to the fixing device 121 only in a period in which the triac 218 that mainly controls the supply of the power from the commercial power supply 200 to the pressure heater HT2 operates (is turned on) to supply the voltage to the pressure heater HT2. To do so, the switching element 314 of the auxiliary power-supply circuit 220 is turned on only for the period in which the triac 218 operates.

Furthermore, the sixth embodiment can facilitate selecting one of the commercial power supply 200 and the auxiliary power-supply circuit 220 and supplying the power to the pressure heater HT2. Specifically, if the power is supplied to the fixing device 121 only from the commercial power supply 200, then the switching element 314 of the auxiliary power-supply circuit 220 is turned off and the triac 218 is turned on.

Moreover, if the power is supplied only from the auxiliary power-supply circuit 220, then the triac 218 is turned off and the switching element 314 of the auxiliary power-supply circuit 220 is turned on. By doing so, the power can be supplied to the pressure heater HT2 through a rectifier 418. The supply of the power from the commercial power supply 200 and that from the auxiliary power-supply circuit 220 are controlled independently of each other. By doing so, the power can be supplied only from the auxiliary power-supply circuit 220 in the period in which the inrush current applied to the fixing heater HT1 converges into the predetermined value. Thereafter, the power obtained by adding the power from the auxiliary power-supply circuit 220 to that from the commercial power supply 200 can be selectively supplied to the fixing device 121.

Figure 19A:
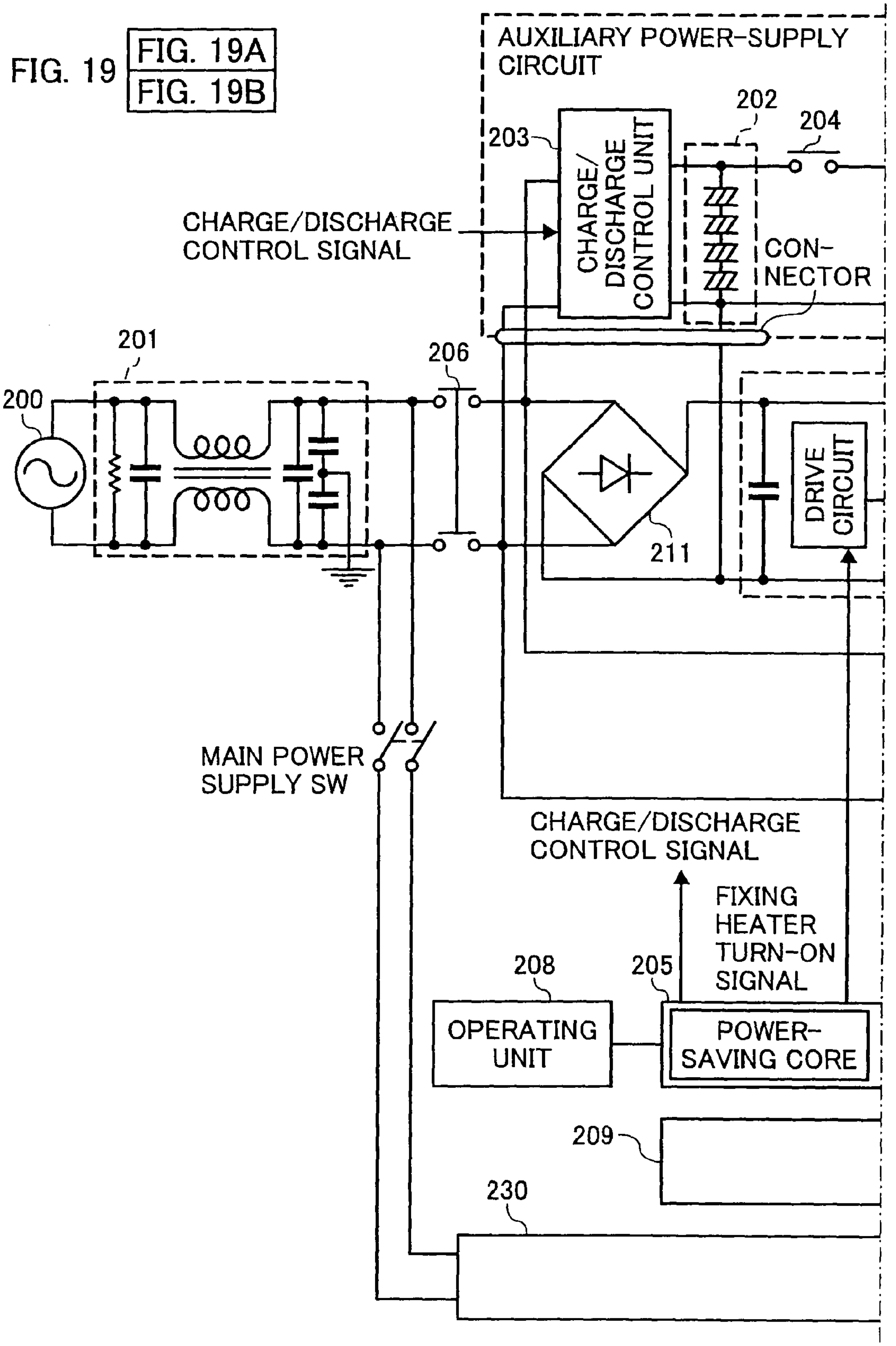
FIG. 19 is a schematic diagram of a control system centering around a fixing device in an image forming apparatus according to a seventh embodiment of the present invention.
Figure 19B:
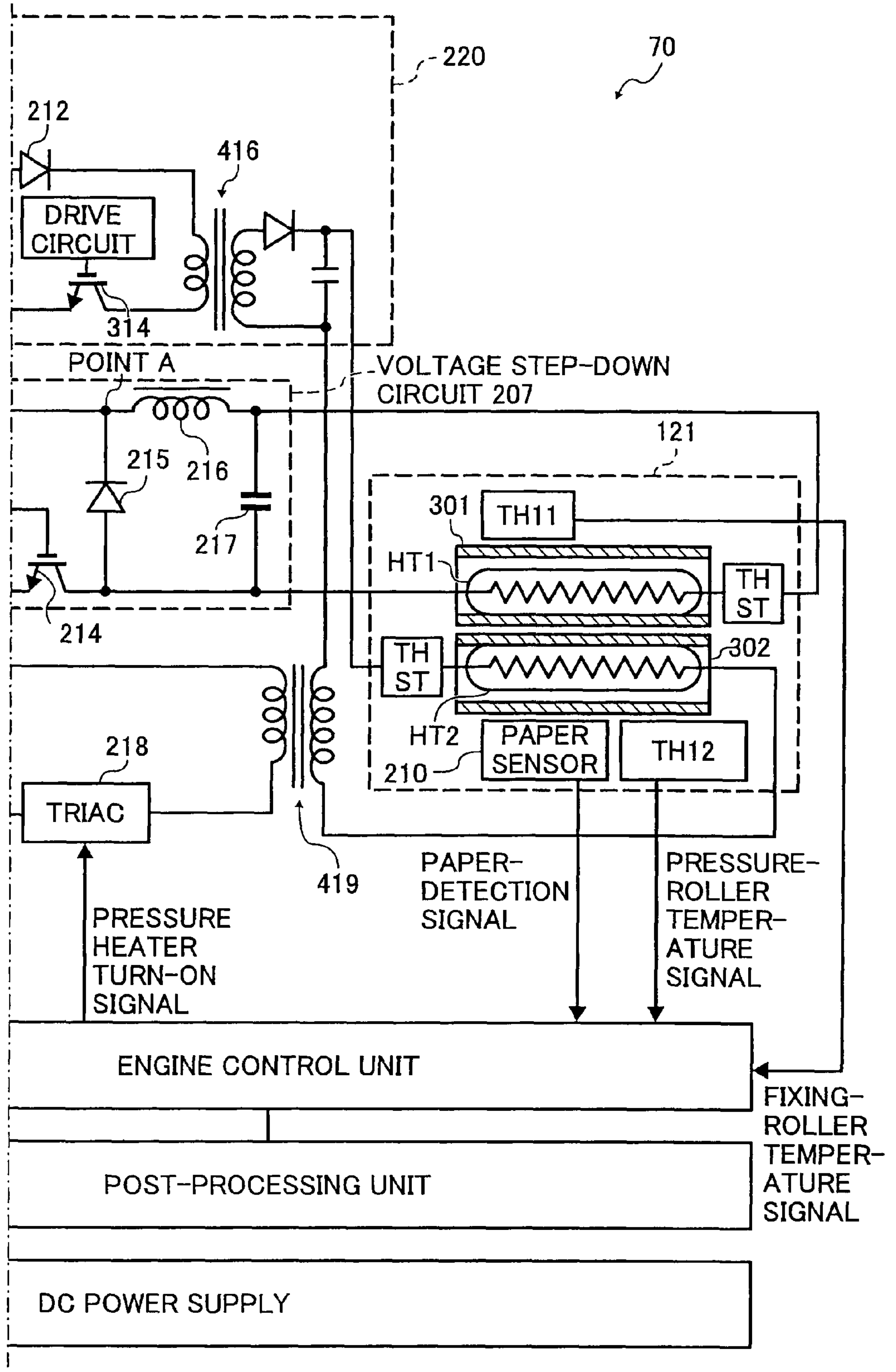

An image forming apparatus according to a seventh embodiment of the present invention will be explained with reference to FIG. 19. FIG. 19 is a block diagram of a control system 70 in the digital copier 1 serving as the image forming apparatus according to the seventh embodiment. In FIG. 19, the same constituent elements as those shown in FIGS. 7 and 16 to 18 are denoted by the same reference symbols and will not be repeatedly explained. The digital copier 1 according to the seventh embodiment is shown in FIG. 20 to be explained later.

The control system 70 mainly including the fixing device 121 according to the seventh embodiment is characterized as follows. An output of the boosting-step-down transformer 416 of the auxiliary power-supply circuit 220 is added to a DC voltage of a secondary circuit obtained by transforming the AC voltage of the commercial power supply 200 using a transformer 419. Due to this, the pressure heater HT2 and the commercial power supply HT2 are isolated from each other by the transformer 419. This makes it difficult to propagate high-frequency noise generated at the secondary circuit to the commercial power supply 200 serving as a primary circuit. Moreover, similarly to the fourth embodiment shown in FIG. 16, the power supply that supplies the power to the pressure heater HT2 can be selected from between the commercial power supply 200 and the auxiliary power-supply circuit 220.

In this manner, the voltage output from the commercial power supply 200 and that from the auxiliary power-supply circuit 220 are added up, and the resultant voltage is supplied to the fixing heater HT1. It is thereby possible to quickly turn on the fixing heater HT1 with a fewer power-supply capacity. Furthermore, the power obtained by adding the power from the auxiliary power-supply circuit 220 to that from the commercial power supply 200, the power only from the commercial power supply 200, or the power only from the auxiliary power-supply circuit 220 can be selected as the power supplied to the fixing heater HT1. Besides, the auxiliary power-supply circuit 220 can be easily detached from the digital copier 1.

In the first to the seventh embodiments, the adding unit for adding up the power from the commercial power supply 200 and the power from the auxiliary power-supply circuit 220 and the power control unit for controlling the addition time are provided. It is thereby possible to supply the higher power with a fewer power capacity to the fixing heater HT1 than the conventional technique, and to quickly turn on the fixing heater HT1. Furthermore, the configuration of adding up the voltage obtained by subjecting the voltage from the commercial power supply 200 to the full-wave rectification and the DC voltage of the auxiliary power-supply circuit 220 is provided. It is thereby possible to supply more power to the fixing device 121 efficiently, and quickly turn on the fixing heater HT1.

Moreover, the adding unit for adding up the output voltage obtained by transforming the voltage of the commercial power supply 200 and the DC voltage of the auxiliary power-supply circuit 220 is provided. It is thereby possible for the fixing heater turn-on circuit that supplies the power from the commercial power supply 200 without changing the frequency of the power to supply more power to the fixing heater HT1. In addition, even if the commercial power supply is directly supplied to the fixing device 121, it is possible to quickly turn on the fixing heater HT1.

Furthermore, the power control unit for adding the DC voltage of the auxiliary power-supply circuit 220 to the voltage of the commercial power supply 200 based on the cycle of the frequency of the commercial power supply 200 is provided. It is thereby possible to reduce the flicker generated by a fluctuation in consumption current of the image forming apparatus as compared with the conventional technique, and level the consumption current. Besides, for the period exceeding one cycle of the frequency of the commercial power supply 200, the DC voltage of the auxiliary power-supply circuit 220 is added to the voltage of the commercial power supply 200. It is thereby possible to reduce the flicker caused by the fluctuation in consumption current of the image forming apparatus as compared with the conventional technique, and exercise the power control with the leveled consumption current. In addition, the unit for adding the power from the auxiliary-power-supply output coil 316 of the auxiliary power-supply circuit 220 to the power from the choke coil 216 of the voltage step-down circuit 207 that constitutes the fixing heater turn-on circuit is provided. It is thereby possible to add up the power from the commercial power supply 200 and that from the auxiliary power-supply circuit 220 with a simpler configuration than that according to the conventional technique. In addition, the higher power than that according to the conventional technique can be supplied to the fixing heater HT1.

The switching operation for turning on or off the switching element 314 of the auxiliary power-supply circuit 220 is performed synchronously with the switching operation for turning on or off the main switching element 214 of the voltage step-down circuit 207. It is thereby possible to efficiently add up the power from the commercial power supply 200 and that from the auxiliary power-supply circuit 220. Further, the triac 218 of the heater turn-on circuit is made conductive synchronously with addition of the power from the auxiliary power-supply circuit 220 to that from the commercial power supply 200. By doing so, even if the power is supplied to the fixing heater HT1 from the commercial power supply 200 without changing the frequency, the adding operation can be performed without a DC component of the consumption current. It is possible to reduce a DC component of the consumption current of the image forming apparatus, accordingly. Moreover, by making the auxiliary power-supply circuit 220 detachable, a user of the image forming apparatus can easily attach the auxiliary power-supply circuit 220 when it is necessary to do so. Besides, because the auxiliary power-supply circuit 220 can be shared among the image forming apparatus and the other apparatuses, the image forming apparatus can be provided at lower cost.

The supply of the power from the auxiliary power-supply circuit 220 to the heater turn-on circuit is made by the magnetic coupling. The user of the image forming apparatus can thereby easily attach or detach the auxiliary power-supply circuit 220. Therefore, both the supply of the power from the auxiliary power-supply circuit 220 to the fixing device 121 and the detachability of the auxiliary power-supply circuit 220 can be realized. A duty cycle of the switching operation is updated with one cycle of the frequency of the commercial power supply set as a unit. By doing so, even if the switching operation is performed at a higher frequency than the frequency of the commercial power supply 200, it is possible to reduce the interference with the commercial power supply 200 as compared with the conventional technique. The output of the voltage step-down circuit 207 that switch over between the power from the commercial power supply 200 and the power obtained by subjecting the power from the commercial power supply 200 to the full-wave rectification at high frequency and the output of the auxiliary power-supply circuit 220 that includes the power supply of the batter element 202 and the auxiliary-power-supply output coil 316 are added up. The added output is supplied to the fixing heater HT1. It is thereby possible to provide the image forming apparatus 1 that enables the fixing device 121 to rise at early rise time with lesser inrush current applied to the fixing device 121.

FIG. 20 is a schematic of the image forming apparatus according to the first to the seventh embodiments of the present invention. The image forming apparatus 1 shown in FIG. 20 can be the digital copier. The image forming apparatus includes not only a copying function but also the other functions such as a printer function and a facsimile function. By operating an application switching key (not shown) of an operating unit, it is possible to sequentially switch over among the copying function, the printer function, and the facsimile function. When the copying function is selected, the image forming apparatus 1 turns into a copy mode. When the printer function is selected, the image forming apparatus 1 turns into a printer mode. When the facsimile function is selected, the image forming apparatus 1 turns into a facsimile mode.

In the image forming apparatus 1, a stack of documents put in a document tray (also "document base") 102 provided in an automatic document feeder (ADF) 101 with an image surface of the stack of documents set as an upper surface is sequentially fed onto a predetermined position on a contact glass 105 by a feed roller 103 and a feed belt 104 one by one from a lowermost document set on the contact glass 105 when the user depresses a start key (not shown) on the operating unit (not shown) in the copy mode. The ADF 101 includes a counting function of counting up the documents whenever one document is fed onto the contact glass 105. An image reader (also "image scanner" or "image reading unit") 106 that constitutes image reading unit reads an image on each document set on the contact glass 105. After the image reader 106 finishes reading the image of the document, the document is discharged onto a discharge tray 108 by the feed belt 104 and a discharge roller 107.

Whenever the image reader 106 finishes reading the image of one document, a document-set detector (also "document-set detection sensor") 109 detects whether a next document is set on the document tray 102. If the document-set sensor 109 detects that the next document is present on the document tray 102, then the lowermost document of the stack of documents on the document tray 102 is fed onto the predetermined position of the contact glass 105 by the feed roller 103 and the feed belt 104 similarly to the previous document. Subsequently, the same operation is performed. It is to be noted that the feed roller 103, the feed belt 104, and the discharge roller 107 are driven by a transport motor (not shown).

A first feeder 110, a second feeder 111, or a third feeder 112 feeds a transfer sheet (paper) stacked on a first feed tray 113, a second feed tray 114, or a third feed tray 115, respectively when one of the first feeder 110, the second feeder 111, and the third feeder 112 is selected. The transfer sheet is transported to a position at which the transfer sheet abuts on a photosensitive body 117 by a longitudinal transport unit 116. As the photosensitive body 117, a photosensitive drum is employed. The photosensitive body 117 is rotation-driven by a main motor (not shown).

Image data (image information) input to the image forming apparatus by causing the image reader to read the image of the document is subjected to a predetermined image processing by an image processor (not shown), and then temporarily stored in an image memory (not shown) which constitutes an image storing unit. The image data is then transmitted to a writing unit 118 that constitutes an image printing unit (a printer), converted into optical information by the writing unit 118, and uniformly charged by a charger (not shown). Thereafter, the optical information from the writing unit 118 is exposed, thereby forming an electrostatic latent image on a surface of the photosensitive body 117. The electrostatic latent image formed on the photosensitive body 117 is developed by a developing device (also "developing unit") 119, thereby forming a toner image.

The photosensitive body 117, the charger, the writing unit 118, the developing device 119, and other well-known units (not shown) around the photosensitive body 117 constitute a printer engine that serves as an image forming unit that performs an image forming operation for forming the image on the transfer sheet based on the image data by electrophotographic technique. A transport belt 120 also functions as a sheet transport unit and a transfer unit, and a transfer bias is applied to the transport belt 120 from a power supply. The transport belt 120 transfers the toner image on the photosensitive body 117 while transporting the transfer sheet from the longitudinal transport unit 116 at a uniform speed to that of the photosensitive body 117. The toner image is fixed onto the transfer sheet by the fixing device 121, and the transfer sheet is discharged to a discharge tray 123. The photosensitive body 117, the charger, the writing unit 118, the developing device 119, the transfer unit, and the image data constitute image forming unit for forming the image on the transfer sheet.

The operation for transferring an image on one side of the transfer sheet in a normal mode has been explained above. If the image is copied on both sides of the transfer sheet in a double-sided mode, the transfer sheet which is fed by one of the first to the third feed trays 113 to 115 and on one surface of which the image is formed is transported not to the discharge tray 123 but to a double-sided sheet transport path 124 by a discharge unit 122. While a front surface and a rear surface of the transfer sheet are inverted by an inverting unit 125, and the transfer sheet is transported to a double-sided transport unit 126.

The transfer sheet transported to the double-sided transport unit 126 is transported to the longitudinal transport unit 116, and transported to the position at which the transfer sheet abuts on the photosensitive body 117 by the longitudinal transport unit 116. A toner image formed on the photosensitive body by the same manner as that explained above is transferred onto the rear surface of the transfer sheet, and fixed onto the rear surface of the transfer sheet by the fixing device 121, thus providing double-sided copy. The double-sided copy is discharged to the discharge tray 123 by the discharge unit 122. Furthermore, if the transfer sheet is inverted and discharged, the transfer sheet the front and rear surfaces of which are inverted by the inverting unit 125 is discharged to the discharge tray 123 by the discharge unit 122 through an inverted-sheet discharge and transport path 127 without transported to the double-sided transport unit 126.

In a print mode, image data is input to the writing unit 118 from an outside instead of the image data from the image processing apparatus, and an image is similarly formed on the transfer sheet. In a facsimile mode, image data from the image reader 106 is transmitted to a call partner by a facsimile transmitting-receiving unit (not shown). In addition, the image data from the call partner is received by the facsimile transmitting-receiving unit and input to the writing unit 118 instead of the image data from the image processing apparatus. As a result, the image is similarly formed on the transfer sheet.

Moreover, the image forming apparatus includes a large-quantity sheet supply unit (hereinafter, "LCT") (not shown), a finisher (a post-processing device), and an operating unit. The finisher (post-processing device) performs processings including sorting, punching, and stapling. The operating unit includes various keys for a setting of a mode for reading a document image, a setting of copy magnification, a sheet-feeder setting, a setting of a post-processing performed by the finisher, and display for an operator, and a display unit including a liquid-crystal display (LCD).

The image reader 106 includes the contact glass 105 on which the document is mounted and an optical scanning system. The optical scanning system includes constituent elements such as an exposure lamp 128, a first mirror 129, a lens 132, a charge-coupled device (CCD) image sensor 133, a second mirror 130, and a third mirror 131. The exposure lamp 128 and the first mirror 129 are fixed onto a first carriage (not shown), and the second mirror 130 and the third mirror 131 are fixed onto a second carriage (not shown). When the image on the document is to be read, the first carriage and the second carriage are mechanically scanned at relative velocities having a two-to-one correspondence, respectively so as not to change an optical path length. The optical scanning system is driven by a driving unit including a scanner driving motor (not shown).

The image reader 106 optically reads the image on the document and converts the read image into an electric signal (reads image data on the document). Namely, the exposure lamp 128 of the optical scanning system illuminates an image surface of the document. A reflected optical image by the image surface is formed on a light-receiving surface of the CCD image sensor 133 through the first mirror 129, the second mirror 130, the third mirror 131, and the lens 132. The reflected optical image formed on the light-receiving surface of the CCD image sensor 133 is converted into the electric signal by the CCD image sensor 133. At the time of conversion, an image-reading magnification in a direction of feeding the document is changed by moving the lens 132 and the CCD image sensor 133 in a lateral direction in FIG. 1. That is, lateral positions of the lens 132 and the CCD image sensor 133 are set to correspond to the preset image-reading magnification.

The writing unit 118 includes such constituent elements as a laser output unit 134, an imaging lens 135, and a mirror 136. A laser diode serving as a laser light source and a polygon mirror (rotational polygon mirror) rotated at a constant velocity by a motor are included in the laser output unit 134. A laser beam (laser light) emitted from the laser output unit 134 is deflected by the polygon mirror rotated at the constant velocity, passed through the imaging lens 135, folded back by the mirror 136, and concentrated and imaged on a charged surface of the photosensitive body 117.

Namely, the laser beam deflected by the polygon mirror of the laser output unit 134 is exposed and scanned in a direction (a main scan direction) orthogonal to a direction in which the photosensitive body 117 rotates. In addition, the image data output from the image processing apparatus is written for every line of the image data. A main scan is repeated in a predetermined cycle corresponding to a rotation velocity of the photosensitive body 117 and a scan density (recording density), thereby forming the electrostatic latent image on the charged surface of the photosensitive body 117.

Figure 21:
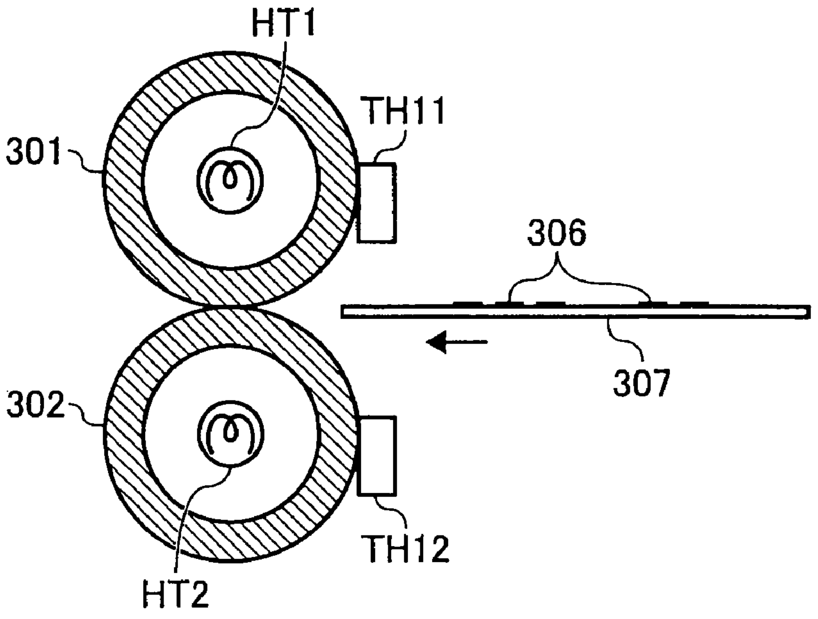
FIG. 21 is a schematic diagram of a fixing device in the image forming apparatus shown in FIG. 20.

A configuration of the fixing device 121 shown in FIG. 20 will be explained with reference to FIG. 21. FIG. 21 is a schematic of the fixing device 121 shown in FIG. 20. The fixing device 121 is configured so that the pressure roller 302 serving as a pressure member made of an elastic member including silicon rubber is pressed against the fixing roller 301 serving as a fixing member at a predetermined pressure by a pressurizing unit (not shown). Generally, rollers are often employed as the fixing member and the pressure member, respectively. Alternatively, any one of or both of the fixing member and the pressure member can be endless belts. The fixing heater HT1 and the pressure heater HT2 are provided in the fixing device 121 at desired positions, respectively. For instance, the fixing heater HT1 is arranged in the fixing roller 301 and heats the fixing roller 301 serving as the fixing member from inside. The pressure heater HT2 is arranged in the pressure roller 302 and heats the pressure roller 302 serving as the pressure member from inside.

The fixing roller 301 and the pressure roller 302 are rotation-driven by a drive mechanism (not shown). The temperature sensor TH11 including the thermistor, which contacts with a surface of the fixing roller 301, detects a surface temperature (fixing temperature) of the fixing roller 301. Likewise, the temperature sensor TH12 including the thermistor, which contacts with a surface of the pressure roller 302, detects a surface temperature of the pressure roller 302. When a sheet 307 serving as a recording medium including a transfer sheet, on which a toner image 306 is carried, passes through a nipping portion between the fixing roller 301 and the pressure roller 302, the toner image 306 is fixed onto the sheet 307 by heat and pressure applied by the fixing roller 301 and the pressure roller 302, respectively.

The fixing heater HT1 serving as the first heating member is turned on when the main power supply of the image forming apparatus 1 is turned on, during a period since the image forming apparatus 1 is in an off mode for power-saving until the image forming apparatus 1 can perform a copying operation, and in all states in which the temperatures of the fixing roller 301 and the pressure roller 302 do not reach target temperatures that are reference temperatures during main operations such as the print operation and copying operation. Accordingly, the fixing heater HT1 serves as a main heating member (main heater). The pressure heater HT2 serving as the second heating member is turned on when the pressure roller 302 does not reach the target temperature that is the reference temperature. The pressure heater HT2 is provided to heat the pressure roller 302 particularly when the temperature of the pressure roller 302 is low. Specifically, the pressure heater HT2 is turned on during operations including a warm-up operation performed by the fixing device 121 at low temperature.

Figure 22:
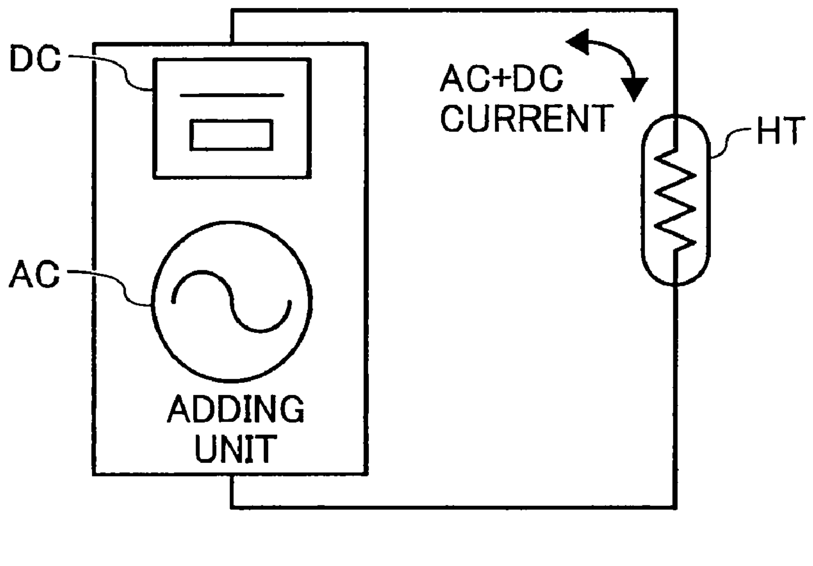
FIG. 22 is a schematic diagram for explaining a method of adding a power supplied from a commercial power supply and a power supplied from an auxiliary power supply in the image forming apparatus shown in FIG. 20.

An outline of the processing for adding the voltage of the auxiliary power supply to that of the commercial power supply will be explained. FIG. 22 is a schematic for explaining the processing for adding the voltage from the auxiliary power supply to that from the commercial power supply will be explained. FIG. 2 depicts a schematic configuration for adding the voltage of the auxiliary power supply including the battery element DC that serves as the unit that supplies a DC power to a power-supply target unit in the image forming apparatus to the voltage supplied from the commercial power supply AC to one heater HT of the fixing device 121. The battery element DC includes the power control unit and the auxiliary power supply. Furthermore, the commercial power supply AC includes the heater turn-on circuit that serves as heater turning-on unit for turning on one heater HT of the fixing device 121 when receiving the power from the commercial power supply AC.

In FIG. 22, the commercial power supply AC and the battery power element DC are connected in series to the heater HT. By so configuring, the voltage obtained by adding up the voltage of the commercial power supply AC and that of the battery element DC in the auxiliary power supply is supplied to the heater HT1, and a current (AC+DC) is applied to the heater HT. The voltage of the commercial power supply AC is supplied to the heater HT by one of the two methods as follows. The AC voltage of the commercial power supply AC is supplied to the heater HT as it is. Alternatively, the AC voltage of the commercial power supply AC is rectified and supplied to the heater HT as either a pulsating voltage or a DC voltage. Likewise, the voltage of the battery element DC is supplied to the heater HT by one of the two methods as follows. The DC voltage of the battery element DC is supplied to the heater HT as it is. Alternatively, the DC voltage of the commercial power supply AC is supplied to the heater HT through the voltage converting unit such as the voltage step-down circuit. The supply methods will be explained later in detail.

Figure 23:
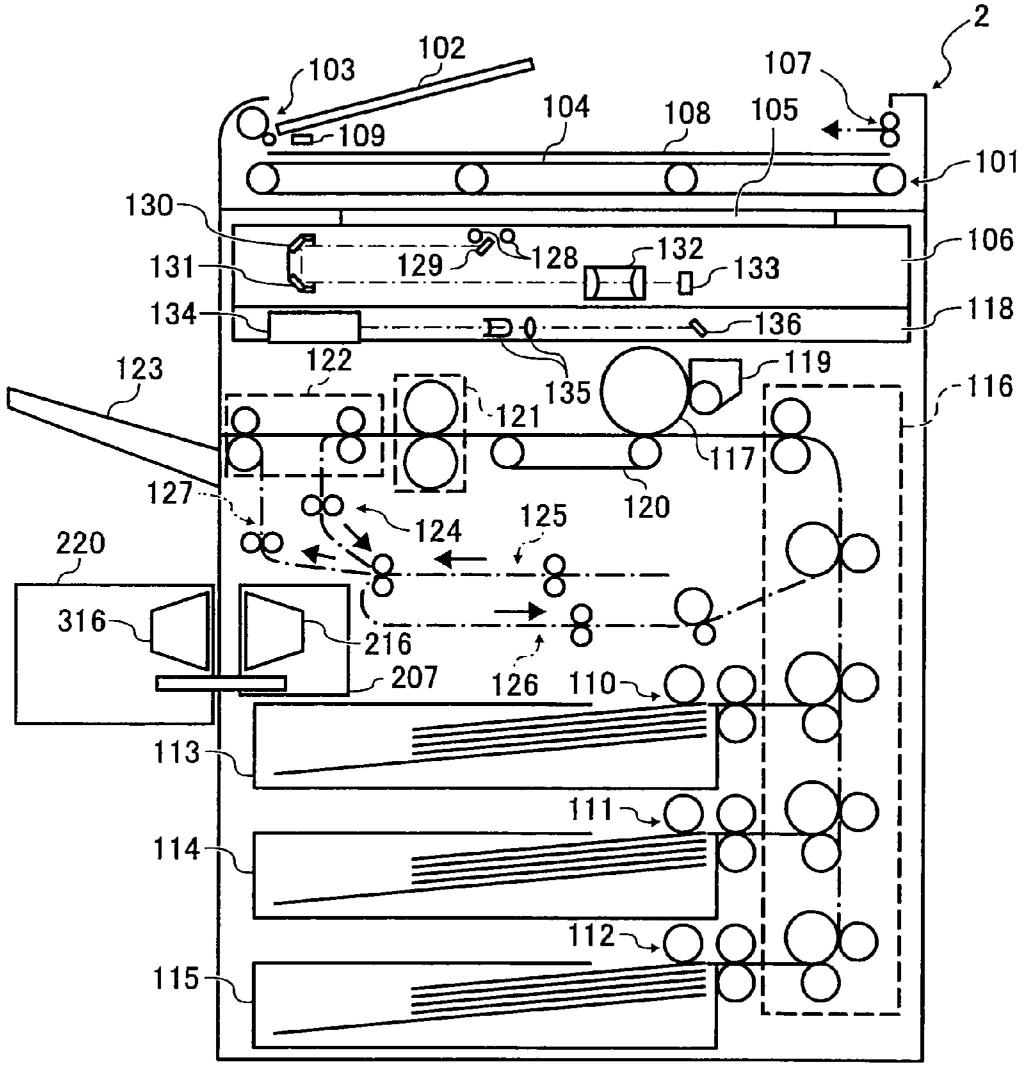
FIG. 23 is a schematic diagram of the image forming apparatus in which the auxiliary power-supply circuit is detachably disposed.

FIG. 23 is a schematic of the digital copier or image forming apparatus 1 in which the auxiliary power-supply circuit 220 is detachably disposed according to the first to seventh embodiments of the present invention. In the image forming apparatus 1 shown in FIG. 23, a connector is employed for signal connection and a choke coil provided separately is employed for signal output. By so configuring, the auxiliary power-supply circuit 220 is configured to be easily detachable from the image forming apparatus 1.

If the power is supplied to the fixing heater HT1 only from the "auxiliary power-supply circuit 220", the power-supply selecting unit turns on the relay 204 and turns off the relay 206. By doing so, the supply of the power from the commercial power supply 200 to the voltage step-down circuit 207 is shut off, and the power is supplied to the fixing heater HT1 only from the "battery element 202" of the auxiliary power-supply circuit 220. The power-supply selecting unit selects the auxiliary power-supply circuit 220 mainly for the time since the image forming apparatus 1 is started (warm-up time, print-start time, or time of return from an power-saving mode) until the inrush current applied to the fixing heater HT1 converges into the predetermined value so as to level the input current and to reduce a temperature ripple of the fixing roller 301.

Figure 24A:
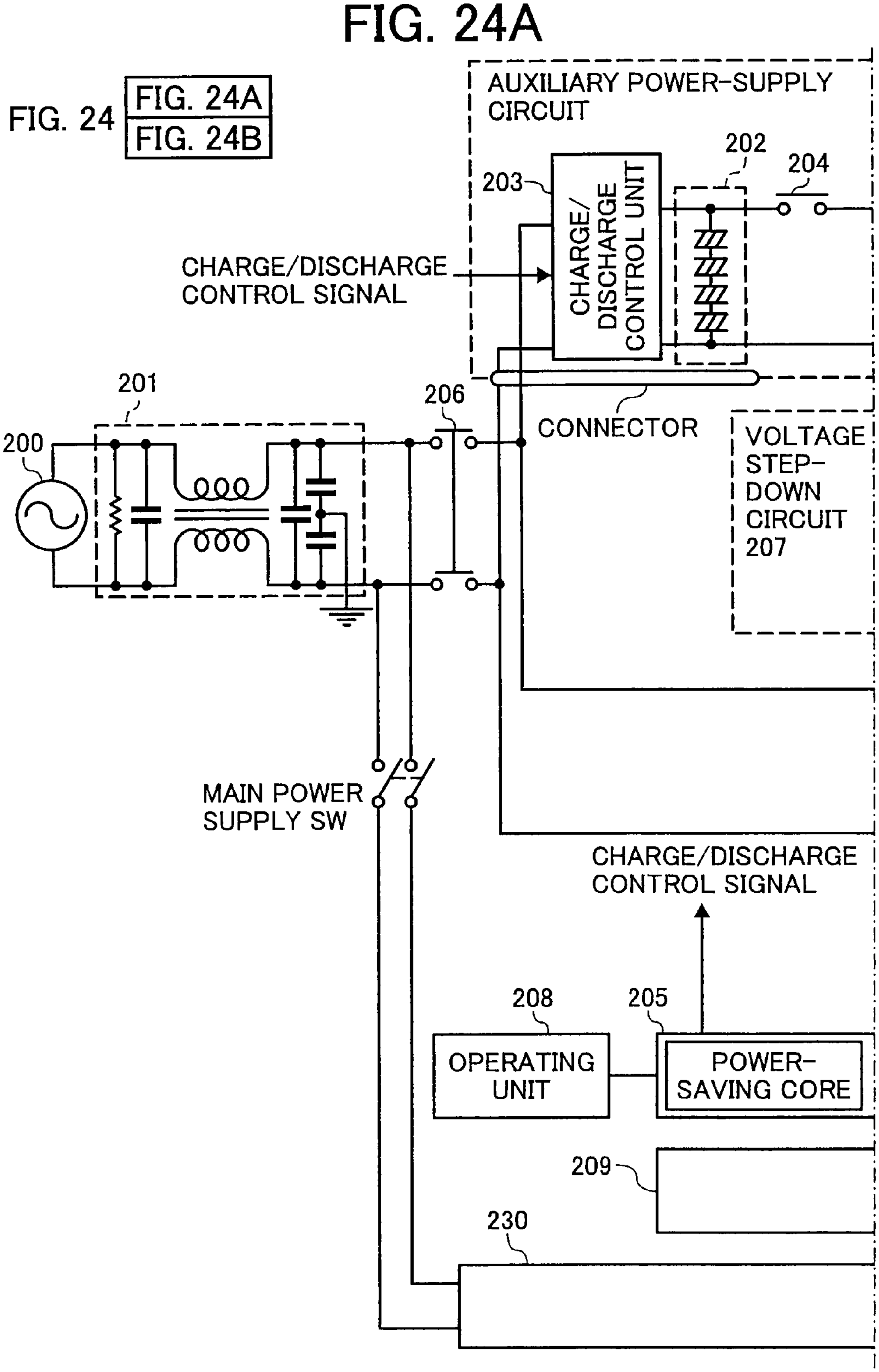
FIG. 24 is a schematic diagram of the control system centering around the fixing device in the digital copier according to the third embodiment, for mainly explaining the configuration of the parts related to the supply of the power from the auxiliary power-supply circuit.
Figure 24B:
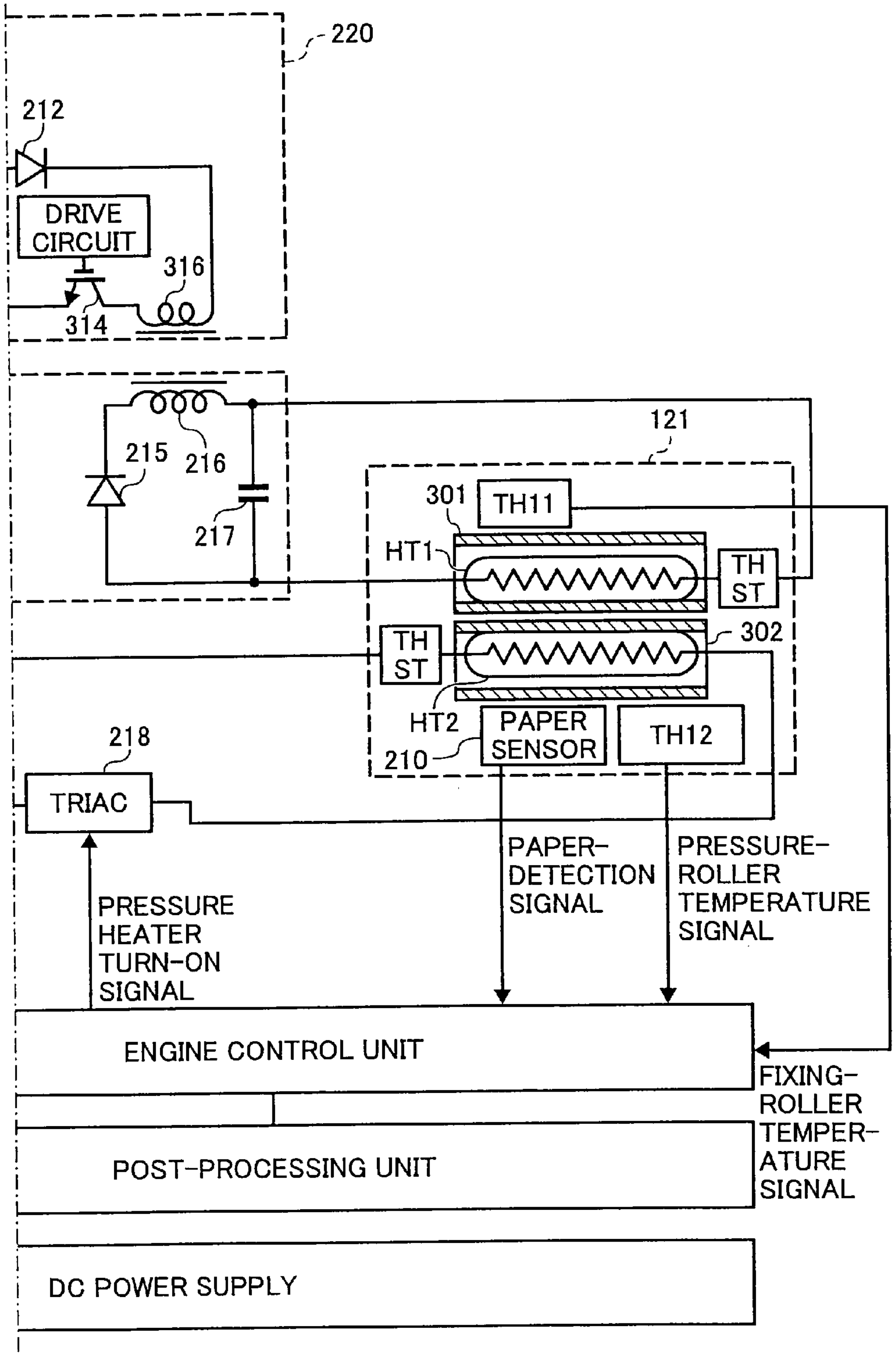

FIG. 24 is a schematic diagram of the control system centering around the fixing device in the digital copier according to the third embodiment, in which the configuration of the parts related to the supply of the power from the auxiliary power-supply circuit 220 is mainly shown. As shown in FIG. 24, the choke coil 216 and the auxiliary-power-supply output coil 316 constitute a transformer. The voltage applied to the fixing heater HT1 is the DC voltage obtained by rectifying the voltage using the rectifier 215 and the smoothing capacitor 217. In the third embodiment, the PWM signal for driving the switching element 314 has a constant level (constant on/off ratio). Alternatively, the level of the PWM signal can be changed according to the voltage supplied to the fixing heater HT1 or the temperature of the fixing roller 301.

If the power is supplied to the fixing heater HT1 from "both the commercial power supply 200 and the battery element 202 of the auxiliary power-supply circuit 220", the power-supply selecting unit turns on both the relays 206 and 204. By doing so, both the "commercial power supply 200" and the "battery element 202" are connected to the input of the voltage step-down circuit 207. As already explained with reference to FIG. 15, the voltage of the commercial power supply 200 and the voltage of the battery element 202 are added up at the choke coil 216, and the power at the resultant voltage is applied to the fixing heater HT1. Both the power from the commercial power supply 200 and that from the battery element 202 of the auxiliary power-supply circuit 220 are selected mainly when the digital copier 1 is started (during warm-up time, print-start time, or at time of return from an power-saving mode), or particularly when the temperature of the fixing heater HT1 is higher than the predetermined temperature.

The image forming apparatus according to the present invention can be applied to every image forming apparatus such as a facsimile apparatus, a printer, and a copier.

The present invention has been explained with reference to the first to the seventh embodiments. However, various changes and modifications can be made of the first to the seventh embodiments. It is to be noted that the configurations and functions explained in the first to the seventh embodiments can be combined as desired.

According to the present embodiments, one of "the commercial power supply", "the battery element", and "both the commercial power supply and the battery element" is selected as the power supply of the voltage step-down circuit that drives the heater of the fixing device based on the operation mode of the image forming apparatus or the temperature of the fixing device. Therefore, if the supply of the power to the fixing device from the commercial power supply runs short, the power supply is switched to "both the commercial power supply and the battery element". It is thereby possible to instantly supply high current to the fixing device. Furthermore, by supplying the high current to the fixing device, the rise time for causing the fixing device to rise can be reduced, and the user-friendliness of the image forming apparatus can be improved.

If "the battery element" is selected as the power supply, the input current input to the image forming apparatus can be reduced by as much as the current supplied to the fixing device. The power thus reduced can be supplied to the other parts in the image forming apparatus. It is, therefore, possible to effectively use the limited power of the image forming apparatus and perform more processings. Examples of the effect of supplying the power to the other parts include accelerated printing speed and ability to drive peripherals and the like.

As described above, according to an embodiment of the present invention, by switching over the power supply among "the commercial power supply", "the battery element", and "both the commercial power supply and the battery element", power consumption control for increasing or reducing the input current to the image forming apparatus on purpose can be exercised. In addition, the current input from the commercial power supply can be leveled.

Furthermore, according to an embodiment of the present invention, whether the power is supplied from "the commercial power supply" or "the battery element", the power is supplied to the heater of the fixing device through the voltage step-down circuit. Therefore, whether the power is supplied from "the commercial power supply" or "the battery element", the power can be supplied to one heater and the supplied power can be controlled. Moreover, this can dispense with a heater dedicated to "the battery element". It is, therefore, possible to greatly simplify the configuration of the fixing device and provide the image forming apparatus at low cost.

Moreover, according to an embodiment of the present invention, the boosting circuit is provided in the "battery element" and the boosting circuit is connected to the voltage step-down circuit that supplies the power to the fixing device. Therefore, even if the voltage of the "battery element" is lowered, constant voltage can be supplied to the fixing device. It is thereby possible to keep the amount of generated heat from the image forming apparatus constant.

Furthermore, according to an embodiment of the present invention, if the "commercial power supply and the battery element" are the power supply of the voltage step-down circuit, the input current to the image forming apparatus can be finely increased or reduced by changing the output voltage of the boosting circuit. Therefore, power-consumption control with smaller fluctuation can be realized.

Moreover, according to an embodiment of the present invention, because of the unit that boost up the voltage of the "battery element", the voltage of the "battery element" can be reduced. The number of expensive electric double-layer capacitors that constitute the "battery element" can be decreased. It is, therefore, possible to provide the image forming apparatus at low cost.

Furthermore, according to an embodiment of the present invention, it is possible to prevent degradation of fixability of the fixing device due to the power shortage, and improve the power factor of the commercial power supply by suppressing the inrush current and reducing conduction interference with the commercial power supply.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

an auxiliary power supply unit including a charging element that is charged by a power supplied from a main power supply unit; and a boosting-step-down transformer that is provided in the auxiliary power supply unit and transforms a power output from the charging element, wherein a power output from a secondary coil of the boosting-step-down transformer and a power supplied from the main power supply unit without passing through the charging element are added on a current path, and the image forming apparatus further includes a device to which the added power is supplied from the current path.

2. The image forming apparatus according to claim 1, further comprising:

a rectifier that rectifies the power supplied from the main power supply unit; and a voltage step-down circuit that steps down a power output from the rectifier, wherein the secondary coil of the boosting-step-down transformer is connected in series to an output of the voltage step-down circuit.

3. The image forming apparatus according to claim 1, further comprising:

a rectifier that rectifies the power supplied from the main power supply unit;

a voltage step-down circuit that steps down a power output from the rectifier; and a rectifier for commutation that is connected in series to the secondary coil of the boosting-step-down transformer.

4. The image forming apparatus according to claim 3, further comprising a switching element that drives the voltage step-down circuit, wherein the power output from the secondary coil of the boosting-step-down transformer is added when the switching element is turned off.

5. The image forming apparatus according to claim 1, further comprising a rectifier that rectifies the power supplied from the main power supply unit, wherein the secondary coil is connected in series to an output of the rectifier.

6. The image forming apparatus according to claim 1, further comprising a transformer that transforms the power supplied from the main power supply unit, wherein the secondary coil is connected in series to a secondary circuit of the transformer.

7. The image forming apparatus according to claim 1, further comprising a heater that is connected in series to the secondary coil, wherein the main power supply unit and the heater are isolated from each other by the transformer.

8. An image forming apparatus comprising:

an auxiliary power supply unit including a charging element that is charged by a power supplied from a main power supply unit; and a boosting-step-down transformer that is provided in the auxiliary power supply unit and configured to transform a power output from the charging element, wherein a circuit of a secondary coil of the boosting-step-down transformer is directly or magnetically connected to a circuit and configured to supply the power supplied from the main power supply unit a power output from the secondary coil of the boosting-step-down transformer and a power supplied from the main power supply unit without passing through the charging element are added on a current path, and the image forming apparatus further includes a device to which the added power is supplied from the current path.

* * * * *